US012659637B2

(12) United States Patent
Cho et al.

(10) Patent No.: US 12,659,637 B2
(45) Date of Patent: Jun. 16, 2026

(54) ELECTRONIC DEVICE INCLUDING SPEAKER

(71) Applicant: SAMSUNG ELECTRONICS CO., LTD., Suwon-si (KR)

(72) Inventors: Joonrae Cho, Suwon-si (KR); Kiwon Kim, Suwon-si (KR); Taeeon Kim, Suwon-si (KR); Myungcheol Lee, Suwon-si (KR); Woojin Cho, Suwon-si (KR); Byounghee Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 188 days.

(21) Appl. No.: 18/481,421

(22) Filed: Oct. 5, 2023

(65) Prior Publication Data

US 2024/0121539 A1 Apr. 11, 2024

Related U.S. Application Data

(63) Continuation of application No. PCT/KR2023/012445, filed on Aug. 22, 2023.

(30) Foreign Application Priority Data

Oct. 7, 2022 (KR) ........................ 10-2022-0128844
Nov. 9, 2022 (KR) ........................ 10-2022-0149094

(51) Int. Cl.
*H04R 1/02* (2006.01)

(52) U.S. Cl.
CPC ...................................... *H04R 1/02* (2013.01)

(58) Field of Classification Search
CPC ......... H04R 1/2811; H04R 1/02; H04M 1/03; G06F 1/16
See application file for complete search history.

(56) References Cited

U.S. PATENT DOCUMENTS 9,197,961 B2 11/2015 Chang et al.
10,356,498 B2 7/2019 Yoon et al.
(Continued)

FOREIGN PATENT DOCUMENTS

CN 211018897 U 7/2020
CN 112073849 A 12/2020
(Continued)

OTHER PUBLICATIONS

PCT International Search Report with its English translation PCT/KR2023/012445 dated Dec. 11, 2023.
(Continued)

*Primary Examiner* — Jason Chan
(74) *Attorney, Agent, or Firm* — CANTOR COLBURN LLP

(57) ABSTRACT

An electronic device includes a housing including a speaker hole, and a speaker module in the housing. The speaker module includes a speaker including a first surface outputting an audio signal, a second surface opposite to the first surface, and a third surface connecting the first surface and the second surface. The speaker module includes a first housing including a first portion including a first opening overlapping the first surface when viewed from above and a second portion disposed on the first portion, a second housing attached to the first housing and including a duct extending from the first opening to the speaker hole, a first space extending from the first opening through the duct to the speaker hole, and a second space in the first housing, being disconnected from the first space by the speaker. The second portion is configured to seal the second space.

18 Claims, 14 Drawing Sheets

(56) References Cited

U.S. PATENT DOCUMENTS

| | | | | |
|---|---|---|---|---|
| 11,237,602 | B2 | 2/2022 | Yoon et al. | |
| 11,622,189 | B2 | 4/2023 | Qin et al. | |
| 11,622,190 | B2 | 4/2023 | Cho et al. | |
| 2022/0078558 | A1 * | 3/2022 | Jiang ........................ | H04R 9/18 |
| 2022/0167079 | A1 | 5/2022 | Kim et al. | |
| 2022/0303670 | A1 | 9/2022 | Otsuki | |

FOREIGN PATENT DOCUMENTS

| | | | | | |
|---|---|---|---|---|---|
| CN | 112073850 | A | | 12/2020 | |
| CN | 112616101 | A | | 4/2021 | |
| CN | 112073850 | | * | 12/2021 | ............... H04R 1/02 |
| CN | 112073850 | B | | 12/2021 | |
| CN | 112004169 | | * | 7/2022 | ............... H04R 1/02 |
| JP | 2005323096 | | * | 11/2005 | |
| JP | 2005323096 | B | | 11/2005 | |
| KR | 20150065481 | | * | 6/2015 | ............... H04R 1/02 |
| KR | 20150065481 | A | | 6/2015 | |
| KR | 101552224 | B1 | | 9/2015 | |
| KR | 20210013218 | | * | 2/2021 | ............... H04R 9/02 |
| KR | 20210013218 | A | | 2/2021 | |
| KR | 20210015556 | A | | 2/2021 | |
| KR | 20230072358 | A | | 5/2023 | |
| WO | 2021164080 | A1 | | 8/2021 | |

OTHER PUBLICATIONS

European Search Report for European Patent Application No. 2387504637 dated Dec. 12. 2025.

* cited by examiner

ELECTRONIC DEVICE INCLUDING SPEAKER

CROSS-REFERENCE TO RELATED APPLICATIONS

This application is a continuation application of International Application No. PCT/KR2023/012445, designating the United States, filed on Aug. 22, 2023, in the Korean Intellectual Property Receiving Office and claiming priority to Korean Patent Application No. 10-2022-0128844, filed on Oct. 7, 2022 and Korean Patent Application No. 10-2022-0149094 filed on Nov. 9, 2022 in the Korean Intellectual Property Office, the disclosures of which are incorporated by reference herein in their entireties.

BACKGROUND

Field

Embodiments of the disclosure relate to an electronic device including a speaker.

Description of the Related Art

An electronic device may include a speaker for providing an audio signal. The speaker may be configured to output an audio signal. The audio signal may be transmitted from the speaker to an outside of the electronic device. The electronic device may include a structure for improving sound quality of the audio signal transmitted from the speaker to the outside of the electronic device.

SUMMARY

An electronic device according to an embodiment includes a housing including a speaker hole and a speaker module in the housing. The speaker module includes a speaker including a first surface outputting an audio signal, a second surface opposite to the first surface, and a third surface extending from the first surface to the second surface. The speaker module includes a first housing a first portion including a first opening overlapping the first surface when viewed from above and a metal, and a second portion disposed on the first portion, the first housing surrounding at least a portion of the third surface of the speaker. The speaker module includes a second housing attached to the first housing and including a duct extending from the first opening to the speaker hole. The speaker module include a first space in contact with the first surface and extending from the first opening through the duct to the speaker hole, and a second space in the first housing, the second space being disconnected from the first space by the speaker. The second portion of the first housing may be configured to seal the second space.

An electronic device according to an embodiment includes a housing including a speaker hole and a speaker module in the housing. The speaker module includes a speaker including a first surface including a diaphragm, a second surface opposite to the first surface and including a yoke, and a third surface extending from the first surface to the second surface. The speaker module includes a first housing including a first portion including a first opening overlapping the first surface when viewed from above, and a second portion disposed on the first portion, the first housing surrounding at least a portion of the third surface of the speaker. The speaker module includes a fastening member disposed in the first housing, the fastening member fastening the speaker to the first housing by coming into contact with a portion of the first housing. The speaker module includes a second housing attached to the first housing and including a duct extending from the first opening to the speaker hole. The speaker module includes a first space being in contact with the first surface and extending from the first opening through the duct to the speaker hole, and a second space in the first housing, the second space being disconnected from the first space by the speaker. The second portion of the first housing may be configured to seal the second space.

DETAILED DESCRIPTION

Figure 1:
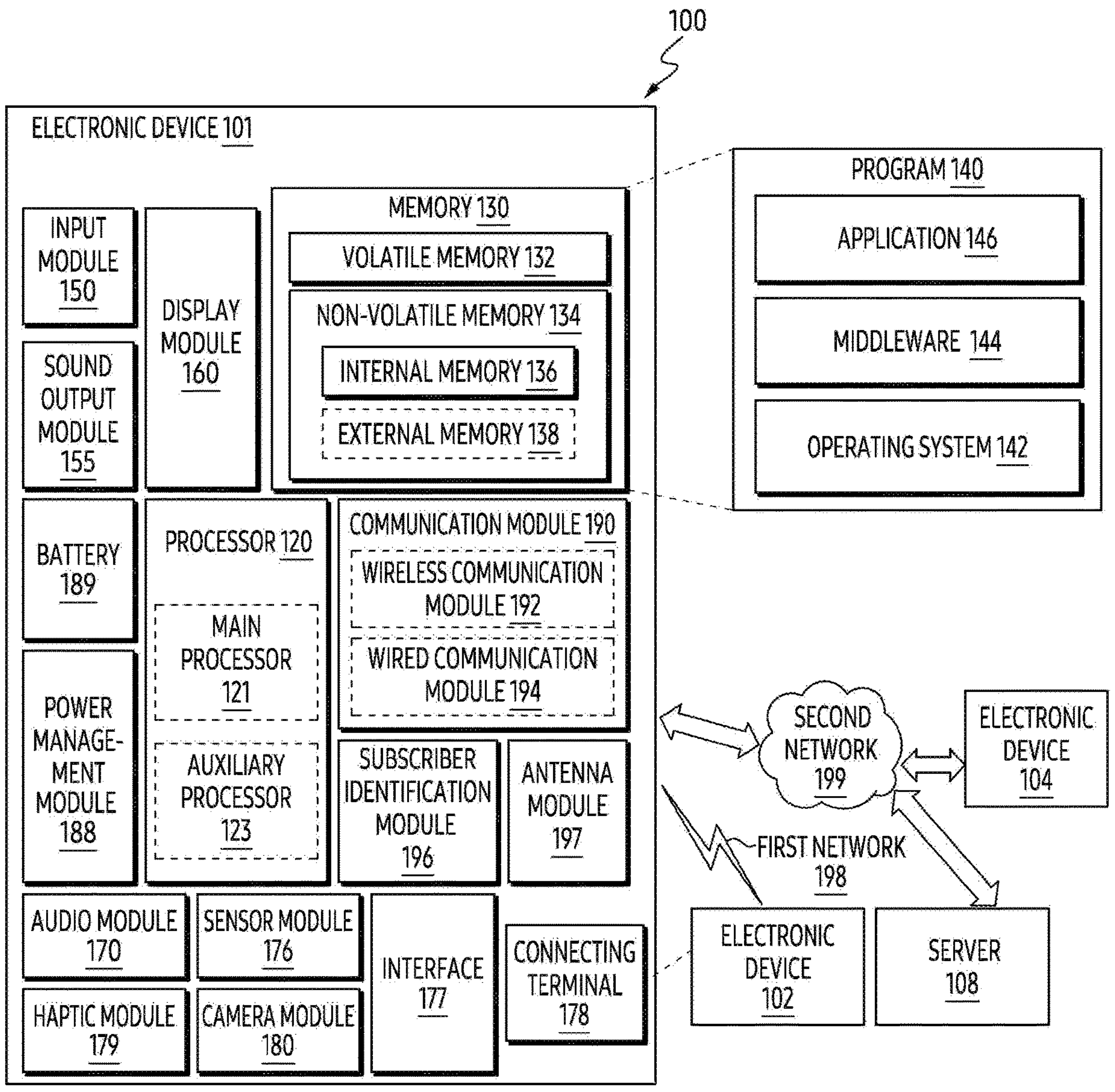
FIG. 1 is a block diagram of an electronic device in a network environment according to an embodiment.

FIG. 1 is a block diagram of an electronic device in a network environment according to an example of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an example, the electronic device 101 may communicate with the electronic device 104 via the server 108. According to an example, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an example, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an example, the auxiliary processor 123 (e.g., an image signal processor or a communication processor) may be implemented as part of another component (e.g., the camera module 180 or the communication module 190) functionally related to the auxiliary processor 123. According to an example, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an example, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an example, the display module 160 may include a touch sensor adapted to detect a touch, or a pressure sensor adapted to measure the intensity of force incurred by the touch.

The audio module 170 may convert a sound into an electrical signal and vice versa. According to an example, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an example, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor. The interface 177 may support one or more specified protocols to be used for the electronic device 101 to be coupled with the external electronic device (e.g., the electronic device 102) directly (e.g., wiredly) or wirelessly. According to an example, the interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an example, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an example, the haptic module 179 may include, for example, a motor, a piezoelectric element, or an electric stimulator.

The camera module 180 may capture a still image or moving images. According to an example, the camera module 180 may include one or more lenses, image sensors, image signal processors, or flashes.

The power management module 188 may manage power supplied to the electronic device 101. According to an example, the power management module 188 may be implemented as at least part of, for example, a power management integrated circuit (PMIC).

The battery 189 may supply power to at least one component of the electronic device 101. According to an example, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an example, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mm Wave band) to address, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an example, the wireless communication module 192 may support a peak data rate (e.g., 20 gigabytes per second (Gbps) or more) for implementing eMBB, loss coverage (e.g., 164 dB or less) for implementing mMTC, or U-plane latency (e.g., 0.5 millisecond (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example, the antenna module 197 may include an antenna including a radiating element including a conductive material or a conductive pattern formed in or on a substrate (e.g., a printed circuit board (PCB)). According to an example, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an example, another component (e.g., a radio frequency integrated circuit (RFIC)) other than the radiating element may be additionally formed as part of the antenna module 197.

According to various embodiments, the antenna module 197 may form a mmWave antenna module. According to an example, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an example, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another example of the disclosure, the external electronic device 104 may include an internet-of-things (IoT) device. The server 108 may be an intelligent server using machine learning and/or a neural network. According to an example, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
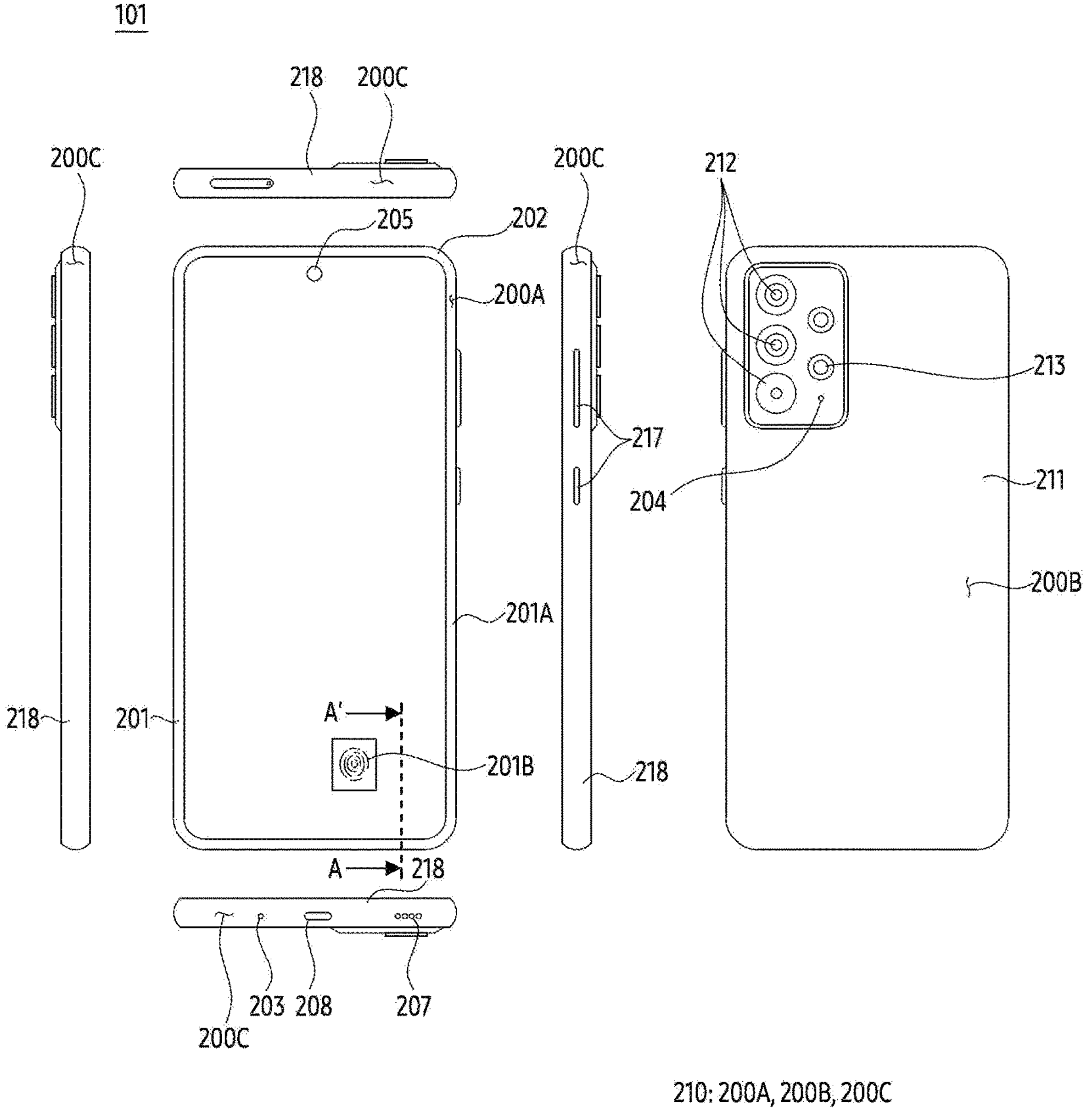
FIG. 2 is a view illustrating an electronic device according to an embodiment.

FIG. 2 is a diagram illustrating an electronic device according to an embodiment.

Referring to FIG. 2, an electronic device 101 according to an embodiment may include a housing 210 forming an exterior of the electronic device 101. For example, the housing 210 may include a front surface 200A, a rear surface 200B, and a side surface 200C surrounding a space between the front surface 200A and the rear surface 200B. According to an embodiment, the housing 210 may refer to a structure forming at least a portion of the front surface 200A, the rear surface 200B, and/or the side surface 200C.

The electronic device 101 according to an embodiment may include a substantially transparent front plate 202. According to an embodiment, the front plate 202 may form at least a portion of the front surface 200A. According to an embodiment, the front plate 202 may include, for example, a glass plate including various coating layers or a polymer plate, but the disclosure is not limited thereto.

The electronic device 101 according to an embodiment may include a substantially opaque rear plate 211. According to an embodiment, the rear plate 211 may form at least a portion of the rear surface 200B. According to an embodiment, the rear plate 211 may be formed of coated or colored glass, ceramic, polymer, metal (e.g., aluminum, stainless steel (STS), or magnesium), or a combination of at least two of the above materials.

The electronic device 101 according to an embodiment may include a side bezel structure (or side member) 218. According to an embodiment, the side bezel structure 218 may be coupled to the front plate 202 and/or the rear plate 211 to form at least a portion of the side surface 200C of the electronic device 101. For example, the side bezel structure 218 may form all of the side surface 200C of the electronic device 101, and for another example, the side bezel structure 218 may form the side surface 200C of the electronic device 101 together with the front plate 202 and/or the rear plate 211.

Unlike the illustrated embodiment, in the case that the side surface 200C of the electronic device 101 is partially formed by the front plate 202 and/or the rear plate 211, the front plate 202 and/or the rear plate 211 may include a region that is bent from its periphery toward the rear plate 211 and/or the front plate 202 and seamlessly extends. The extended region of the front plate 202 and/or the rear plate 211 may be positioned at both ends of, for example, a long edge of the electronic device 101, but the disclosure is not limited to the above-described examples.

According to an embodiment, the side bezel structure 218 may include a metal and/or a polymer. According to an embodiment, the rear plate 211 and the side bezel structure 218 may be integrally formed and may include the same material (e.g., a metal material such as aluminum), but the disclosure are not limited thereto. For example, the rear plate 211 and the side bezel structure 218 may be formed in separate configurations and/or may include different materials.

According to an embodiment, the electronic device 101 may include at least one of a display 201, an audio module 203, 204 and 207, a sensor module (not shown), a camera module 205, 212, 213, a key input device 217, a light emitting device (not shown), and/or a connector hole 208. According to another embodiment, the electronic device 101 may omit at least one of the components (e.g., a key input device 217 or a light emitting device (not shown)), or may further include another component.

According to an embodiment, the display 201 may be visually exposed through a substantial portion of the front plate 202. For example, at least a portion of the display 201 may be visible through the front plate 202 forming the front surface 200A. According to an embodiment, the display 201 may be disposed on the rear surface of the front plate 202.

According to an embodiment, the appearance of the display 201 may be formed substantially the same as the appearance of the front plate 202 adjacent to the display 201. According to an embodiment, in order to expand the area in which the display 201 is visually exposed, the distance between the outside of the display 201 and the outside of the front plate 202 may be formed to be generally the same.

According to an embodiment, the display 201 (or the front surface 200A of the electronic device 101) may include a screen display area 201A. According to an embodiment, the display 201 may provide visual information to a user through the screen display area 201A. In the illustrated embodiment, when the front surface 200A is viewed from the front, it is illustrated that the screen display area 201A is spaced apart from the outside of the front surface 200A and is positioned inside the front surface 200A, but the disclosure is not limited thereto. In another embodiment, when the front surface 200A is viewed from the front, at least a portion of the periphery of the screen display area 201A may substantially coincide with the periphery of the front surface 200A (or the front plate 202).

According to an embodiment, the screen display area 201A may include a sensing area 201B configured to obtain biometric information of a user. Here, the meaning of "the screen display area 201A including the sensing area 201B" may be understood to mean that at least a portion of the sensing area 201B may be overlapped on the screen display area 201A. For example, the sensing area 201B, like other areas of the screen display area 201A, may refer to an area in which visual information may be displayed by the display 201 and additionally biometric information (e.g., fingerprint) of a user may be obtained. In another embodiment, the sensing area 201B may be formed in the key input device 217.

According to an embodiment, the display 201 may include an area in which the first camera module 205 is positioned. According to an embodiment, an opening may be formed in the area of the display 201, and the first camera module 205 (e.g., a punch hole camera) may be at least partially disposed in the opening to face the front surface 200A. In such a case, the screen display area 201A may surround at least a portion of the periphery of the opening. According to an embodiment, the first camera module 205 (e.g., an under display camera (UDC)) may be disposed under the display 201 to overlap the area of the display 201. In this case, the display 201 may provide visual information to the user through the area, and additionally, the first camera module 205 may obtain an image corresponding to a direction facing the front surface 200A through the area of the display 201.

According to an embodiment, the display 201 may be coupled to or disposed adjacent to a touch sensing circuit, a pressure sensor capable of measuring the intensity (pressure) of the touch, and/or a digitizer that detects a magnetic field type stylus pen.

According to an embodiment, the audio modules 203, 204 and 207 may include microphone holes 203 and 204, and a speaker hole 207.

According to an embodiment, the microphone holes 203 and 204 may include a first microphone hole 203 formed in a partial area of the side surface 200C and a second microphone hole 204 formed in a partial area of the rear surface 200B. A microphone (not shown) for obtaining an external sound may be disposed inside the microphone holes 203 and 204. The microphone may include a plurality of microphones to detect the direction of sound.

According to an embodiment, the second microphone hole 204 formed in a partial area of the rear surface 200B may be disposed adjacent to the camera modules 205, 212 and 213. For example, the second microphone hole 204 may obtain sound according to operations of the camera modules 205, 212, and 213. However, the disclosure is not limited thereto.

According to an embodiment, the speaker hole 207 may include an external speaker hole 207 and a receiver hole (not illustrated) for a call. The external speaker hole 207 may be formed on a portion of the side surface 200C of the electronic device 101. According to an embodiment, the external speaker hole 207 may be implemented as a single hole together with the microphone hole 203. Although not illustrated, a receiver hole (not shown) for a call may be formed on another portion of the side surface 200C. For example, the receiver hole for a call may be formed on the opposite side of the external speaker hole 207 on the side surface 200C. For example, with respect to the illustration of FIG. 2, the external speaker hole 207 may be formed on the side surface 200C corresponding to the lower end of the electronic device 101, and the receiver hole for a call may be formed on the side surface 200C corresponding to the upper end of the electronic device 101. However, the disclosure is not limited thereto, and according to an embodiment, the receiver hole for a call may be formed at a position other than the side surface 200C. For example, the receiver hole for a call may be formed by a space spaced apart between the front plate 202 (or display 201) and the side bezel structure 218.

According to an embodiment, the electronic device 101 may include at least one speaker (not illustrated) configured to output sound to the outside of the housing 210 through an external speaker hole 207 and/or a receiver hole (not shown) for a call.

According to an embodiment, the sensor module (not shown) may generate an electrical signal or data value corresponding to an internal operating state or an external environmental state of the electronic device 101. For example, the sensor module may include at least one of a proximity sensor, an HRM sensor, a fingerprint sensor, a gesture sensor, a gyro sensor, a pressure sensor, a magnetic sensor, an acceleration sensor, a grip sensor, a color sensor, an infrared (IR) sensor, a biometric sensor, a temperature sensor, a humidity sensor, and an illumination sensor.

According to an embodiment, the camera modules 205, 212 and 213 may include a first camera module 205 disposed to face the front surface 200A of the electronic device 101, a second camera module 212 disposed to face the rear surface 200B, and a flash 213.

According to an embodiment, the second camera module 212 may include a plurality of cameras (e.g., a dual camera, a triple camera, or a quad camera). However, the second camera module 212 is not necessarily limited to including a plurality of cameras, and may include one camera.

According to an embodiment, the first camera module 205 and the second camera module 212 may include one or a plurality of lenses, an image sensor, and/or an image signal processor.

According to an embodiment, the flash 213 may include, for example, a light emitting diode or a xenon lamp. According to an embodiment, two or more lenses (infrared camera, wide-angle and telephoto lens) and image sensors may be disposed on one side of the electronic device 101.

According to an embodiment, the key input device 217 (e.g., an input module 150 of FIG. 1) may be disposed on the side surface 200C of the electronic device 101. In another embodiment, the electronic device 101 may not include some or all of the key input devices 217, and the key input device 217 not included therein may be implemented on the display 201 in another form such as a soft key.

According to an embodiment, the connector hole 208 may be formed on the side surface 200C of the electronic device 101 to accommodate the connector of the external device. A connection terminal electrically connected to the connector of the external device may be disposed in the connector hole 208. The electronic device 101 according to an embodiment may include an interface module for processing electrical signals transmitted and received through the connection terminal.

According to an embodiment, the electronic device 101 may include a light emitting device (not shown). For example, the light emitting device (not shown) may be disposed on the front surface 200A of the housing 210. The light emitting device (not shown) may provide state information of the electronic device 101 in a form of light. In another embodiment, the light emitting device (not shown) may provide a light source when the first camera module 205 is operated. For example, the light emitting device (not shown) may include an LED, an IR LED, and/or a xenon lamp.

Figure 3:
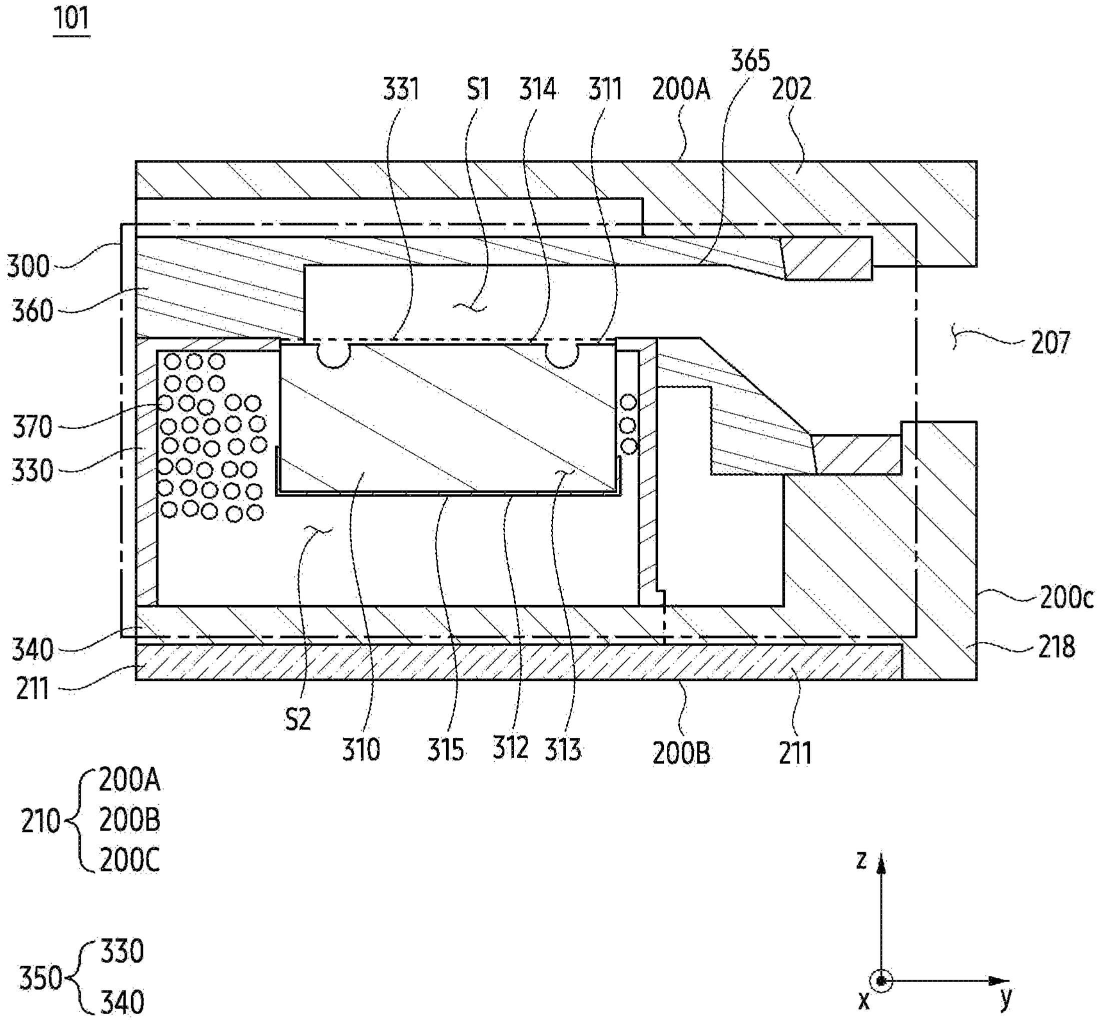
FIG. 3 is a partial cross-sectional view of an example electronic device taken along line A-A' of FIG. 2.

FIG. 3 is a partial cross-sectional view of an example electronic device taken along line A-A' of FIG. 2.

Referring to FIG. 3, the electronic device 101 may include a housing 210 and a speaker module 300. The housing 210 may include or define a speaker hole 207. The speaker hole 207 may be connect an inside of the housing 210 to an outside thereof. speaker module 300 may include a speaker 310, a first housing 350, and a second housing 360. The first housing 350 and the second housing 360 may together define a speaker housing.

According to an embodiment, the housing 210 may include a front surface 200A, a rear surface 200B opposite to the front surface 200A, and a side surface 200C surrounding a space between the front surface 200A and the rear surface 200B. The speaker hole 207 may be disposed on the side surface 200C of the housing 210. For example, the speaker hole 207 may be included in a structure (e.g., the side bezel structure 218) disposed on the side surface 200C of the housing 210. An audio signal generated in the electronic device 101 may be transmitted to the outside of the electronic device 101 through the speaker hole 207.

According to an embodiment, the speaker module 300 may be disposed in the housing 210. The speaker module 300 may be configured to generate an audio signal. For example, the speaker module 300 may be disposed in an inner space of the housing 210 which is surrounded or bounded by the front surface 200A together with the rear surface 200B, and the side surface 200C. For example, the speaker module 300 may be disposed in between a structure (e.g., the front plate 202 or the display (e.g., the display 201 of FIG. 2)) disposed on the front surface 200A and a structure (e.g., the rear plate 211) disposed on the rear surface 200B. In order to transmit the audio signal to the outside through the speaker hole 207 disposed on the side surface 200C, the speaker module 300 may be disposed to face the side surface 200C of the housing 210. That is, an output direction of the speaker module 300 may be in a lateral direction from the inner space of the housing 210 and toward the side surface 200C. According to an embodiment, the speaker 310 may include a first surface 311 configured to output the audio signal, a second surface 312 opposite to the first surface 311, and a third surface 313 extending from the first surface 311 to the second surface 312. The first surface 311 may include a diaphragm 314. The second surface 312 may include and/or define a yoke 315.

For example, although not illustrated herein, the speaker 310 may include at least one voice coil for providing vibration to the diaphragm 314 and a magnet capable of forming a magnetic field in the speaker 310. When a current flows through the at least one voice coil, a magnetic field formed in the voice coil may interact with the magnetic field formed by the magnet to vibrate the voice coil. Based on the vibration of the voice coil, the diaphragm 314 connected to the voice coil may be configured to vibrate. The speaker 310 may be configured to output the audio signal based on the vibration of the diaphragm 314.

For example, the diaphragm 314 may be disposed along the first surface 311 in the speaker 310. The diaphragm 314 may vibrate in a first direction (e.g., −z direction) toward the second surface 312 of the speaker 310 or in a second direction (e.g., +z direction) opposite to the first direction. The audio signal output based on the vibration of the diaphragm 314 may be transmitted from the first surface 311 through the speaker hole 207 to the outside.

For example, the yoke 315 may be disposed along the second surface 312 of the speaker 310. The yoke 315 may include a metal plate disposed on the second surface 312 of the speaker 310. The yoke 315 may be configured to form a magnetic circuit for amplifying a magnetic field formed in the speaker 310.

For example, the third surface 313 of the speaker 310 may be formed to surround a space of the speaker 310 between the first surface 311 and the second surface 312. The third surface 313 may provide a space in which the diaphragm 314 can vibrate.

According to an embodiment, the first housing 350 may be formed to surround at least a portion of the third surface 313 of the speaker 310. The first housing 350 may include a first portion 330 and a second portion 340 which is disposed on the first portion 330. The first portion 330 may include (or define) a first opening 331 overlapping the first surface 311 of the speaker 310 when viewed from above. In the view from above (e.g., along the z direction), the first opening 331 may defined by horizontal portions of the first portion 330.

Throughout the disclosure, it is to be appreciated that when an element is referred to as being "on" another element, it may be placed directly on the other element or there may exist any intervening elements therebetween. In contrast, when an element is referred to as being "directly on" another element, it may no intervening element exists therebetween. For example, throughout the disclosure, an expression "B disposed on A" may refer to "B in contact with A". For example, throughout the disclosure, an expression "B disposed on A" may refer to "B faced away from A". For example, an expression "a second portion disposed on a first portion" may refer to "a second portion in contact with the first portion," where contact may indicate elements form an interface therebetween, without being limited thereto. As another example, an expression "a second portion disposed on a first portion" may refer to "a second portion faced away a first portion".

For example, the first portion 330 may be connected to the second portion 340. For example, the first portion 330 may meet the second portion 340 and extend from the second portion 340. For example, the first portion 330 may be coupled to the second portion 340. For example, the first portion 330 may be attached to the second portion 340. For example, the first portion 330 may be coupled to the second portion 340, through at least one component (e.g., an adhesive material) between the first portion 330 and the second portion 340. For example, one among the first portion 330 and the second portion 340 may extend to define the other one of the first portion 330 and the second portion 340, so as to form a unitary structure.

For example, the first portion 330 of the first housing 350 may be disposed in +z direction with respect to the speaker 310. The second portion 340 of the first housing 350 may be disposed in −z direction opposite to +z direction with respect to the speaker 310. For example, the first portion 330 may be disposed in a direction in which the first surface 311 of the speaker 310 faces the front surface 200A of the housing 210 with respect to the speaker 310. The second portion 340 may be disposed in a direction that the second surface 312 opposite to the first surface 311 of the speaker 310 faces the rear surface 200B opposite to the front surface 200A of the housing 210, with respect to the speaker 310.

For example, the first opening 331 may be of a passage through which an audio signal output from the speaker 310 passes. The first opening 331 may have a shape corresponding to the first surface 311 of the speaker 310. The audio signal output from the speaker 310 may be transmitted from the first surface 311 of the speaker 310 through the first opening 331 to the speaker hole 207 of the housing 210. For example, the first opening 331 may have the shape corresponding to the first surface 311 of the speaker 310, thereby providing the passage through which the audio signal passes.

For example, the first portion 330 of the first housing 350 may surround the third surface 313 of the speaker 310. For example, the first portion 330 of the first housing 350 may surround a portion of the third surface 313 of the speaker 310, and the second portion 340 of the second housing 360 may surround the remaining portion of the third surface 313.

According to an embodiment, the second housing 360 may be attached to the first housing 350. The second housing 360 may include a duct 365 (e.g., an audio signal path) extending from the first opening 331 of the first housing 350 to the speaker hole 207 of the housing 210.

For example, the second housing 360 may be attached to the first portion 330 of the first housing 350 including the first opening 331. The second housing 360 may be attached to the first portion 330 of the first housing 350 so as to support the first housing 350.

For example, the duct 365 may be of a passage through which the audio signal output from the speaker 310 is emitted from an inner space of the electronic device 101 and toward the outside of the electronic device 101. The audio signal may be transmitted from the first surface 311 of the speaker 310 to the speaker hole 207, through the first opening 331 and the duct 365 which extends from the first opening 331 to the speaker hole 207. The audio signal transmitted to the speaker hole 207 may be transmitted to the outside of the electronic device 101 through the speaker hole 207.

According to an embodiment, the speaker module 300 may include a first space S1 that is in contact with or defined by the first surface 311 of the speaker 310, and extends from the first opening 331, through the duct 365 and to the speaker hole 207. For example, the first space S1 may include an inner space of the duct 365. For example, the first space S1 may be defined as a space surrounded by the first surface 311 of the speaker 310, the inner surface of the duct 365, and the speaker hole 207. The first space S1 may be a space through which the audio signal generated from the speaker 310 is transmitted to the outside of the electronic device 101 (e.g., an audio signal transmission space). Owing to including the first space S1, the speaker module 300 may provide a passage through which the audio signal output from the speaker 310 is transmitted to the outside of the electronic device 101.

According to an embodiment, the speaker module 300 may include a second space S2 in the first housing 350 that is disconnected from the first space S1 by the speaker 310. That is, the first space S1 and the second space S2 are not in communication with each other, and are separated from each other by the speaker 310.

For example, the second space S2 may be separated from the first space S1 by the speaker 310, with respect to the first opening 331. The second space S2 may be defined as a space surrounded by at least a portion of the speaker 310 and the first housing 350. For example, the second space S2 may be an inner space of the first housing 350. For example, the first housing 350 may be spaced apart from the second surface 312 of the speaker 310. The second space S2 may include a space between the first housing 350 and the second surface 312. For example, the first housing 350 may be spaced apart from the third surface 313 of the speaker 310. The second space S2 may include a space between the first housing 350 and the third surface 313.

According to an embodiment, the second portion 340 of the first housing 350 may be formed to seal the second space S2. For example, the second portion 340 may be formed to cover at least a portion of the speaker 310 disposed in the first housing 350. For example, the first portion 330 may include at least one opening spaced apart from the speaker 310. The second portion 340 may be formed to cover the at least one opening.

For example, the diaphragm 314 of the speaker 310 may be configured to output audio signals in the first direction and the second direction, by vibrating in a first direction (e.g., −z direction) in which the first surface 311 faces the second surface 312 opposite to the first surface 311 and in a second direction (e.g., +z direction) opposite to the first direction. A phase of the audio signal output in the first direction may have a phase opposite to the phase of the audio signal output in the second direction which is opposite to the first direction, owing to vibration of the diaphragm 314. The second portion 340 of the first housing 350 may be configured to seal the second space S2 for the audio signal output in the second direction, thereby blocking destructive interference between the audio signal output in the first direction and the audio signal output in the second direction. The second portion 340 of the first housing 350 can improve the sound quality of the audio signal output based on the vibration of the diaphragm 314, owing to blocking the destructive interference.

For example, the second space S2 may provide a space for the audio signal output in the first direction (e.g., −z direction) facing the second surface 312 opposite to the first surface 311, by vibration of the diaphragm 314. The second space S2 may be a space for resonance of the audio signal output by vibration of the diaphragm 314. A vibration range of the diaphragm 314 may be limited by the audio signal output in the first direction, as the frequency of the audio signal output by vibration of the diaphragm 314 gets lower. The sealed second space S2 may provide an additional space for the audio signal output in the first direction, thereby reducing such a limitation of the vibration range of the diaphragm 314. As the second portion 340 (or more generally the first housing 350) is disposed in the first direction with respect to the speaker 310 to "seal" the second space S2, the audio signal emitted in the first direction can be blocked.

According to an embodiment, the first portion 330 of the first housing 350 may include metal. For example, the first portion 330 may include stainless used steel (SUS). The first portion 330 may include metal so as to reduce the thickness of the first housing 350. The first housing 350 may increase the volume of the second space S2 within the electronic device 101, by reducing the thickness thereof. According to an embodiment, the second portion 340 disposed on the first portion 330 may include metal to reduce the thickness of the first housing That is, the first housing 350 may increase the volume of the second space S2 within the electronic device 101, by reducing the thickness thereof at the second portion 340. The first housing 350 can improve the sound quality of the audio signal output from the speaker 310, owing to such an expanded second space S2.

According to an embodiment, the speaker module 300 may further include an air adsorption material 370 (indicated by the plurality of circles in FIG. 3) inside the second space S2. For example, the air adsorption material 370 may include at least one of zeolite or activated carbon. The air adsorption material 370 may provide a virtual back volume to the second space S2 for resonance of the audio signal output from the speaker 310, by adsorbing air inside the second space S2. The second space S2 formed (or provided) with the back volume through the air adsorption material 370 can improve the sound quality of the audio signal output from the speaker 310.

According to an embodiment, the second portion 340 of the first housing 350 may be at least a portion of the housing 210. For example, the second portion 340 of the first housing 350 may be the rear plate 211 of the housing 210. For example, the second portion 340 of the first housing 350 may extend from the side bezel structure 218. For example, the second space S2 may be sealed by at least a portion of the housing 210. As the second portion 340 is configured as at least a portion of the housing 210, the speaker module 300 can increase the volume of the second space S2 and simplify the structure of the speaker module 300.

The electronic device 101 according to the above-described embodiment may include the speaker module 300 including the first housing 350 and the second housing 360, thereby improving the sound quality of the audio signal output from the speaker 310 and protecting the speaker 310 from an external impact. The first housing 350 may include the first opening 331 connected to the duct 365 of the second housing 360, thereby simplifying the structure of the speaker module 300. The first housing 350 can improve the sound quality of the audio signal, by providing the second space S2 for resonance of the audio signal output from the speaker 310. As the first housing 350 includes metal, it is possible to increase the volume of the second space S2. The second portion 340 of the first housing 350 with sealed second space S2 can improve the sound quality of the audio signal output from the speaker 310.

Figure 4A:
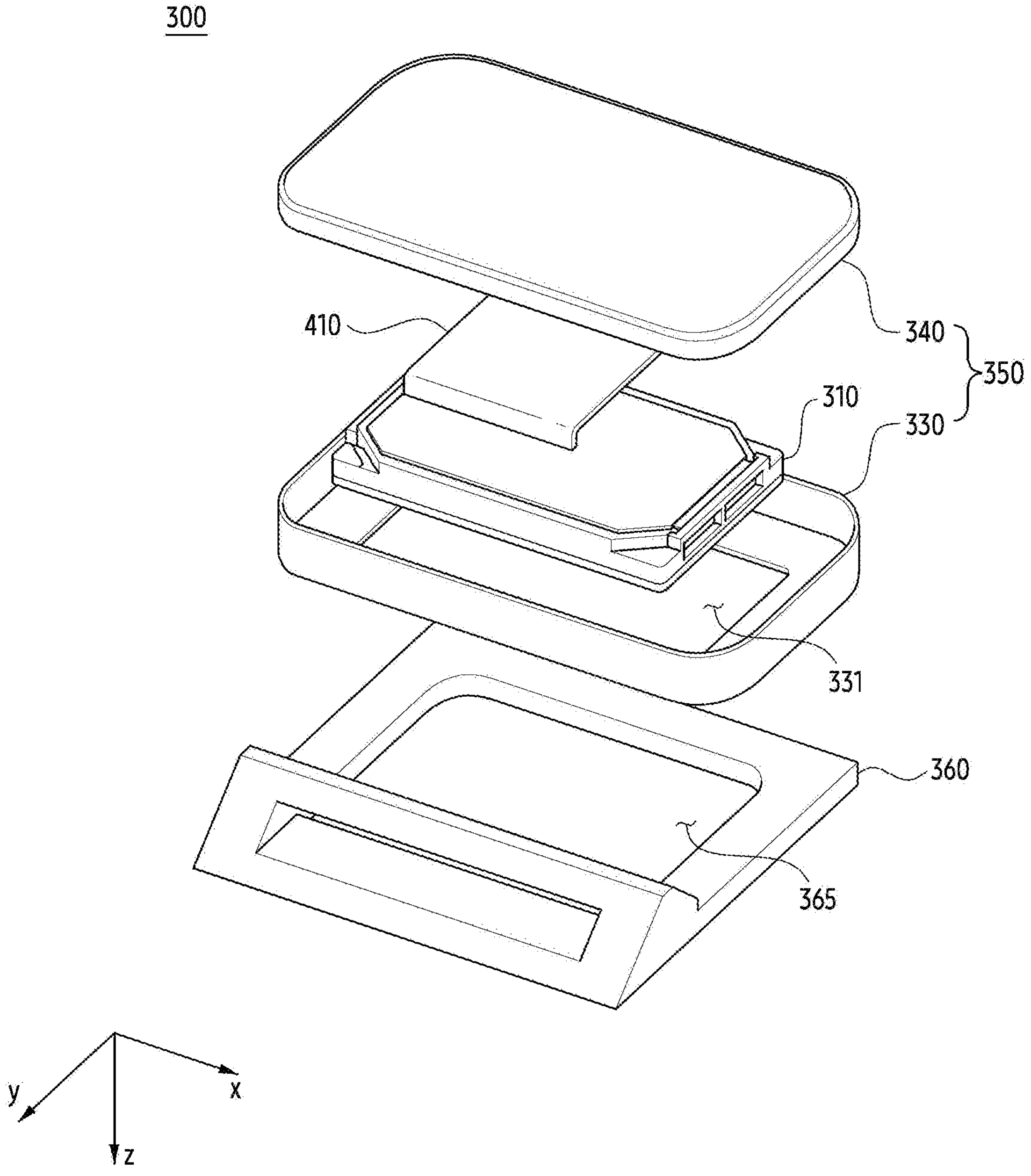
FIG. 4A is an exploded perspective view of an example speaker module.
Figure 4B:
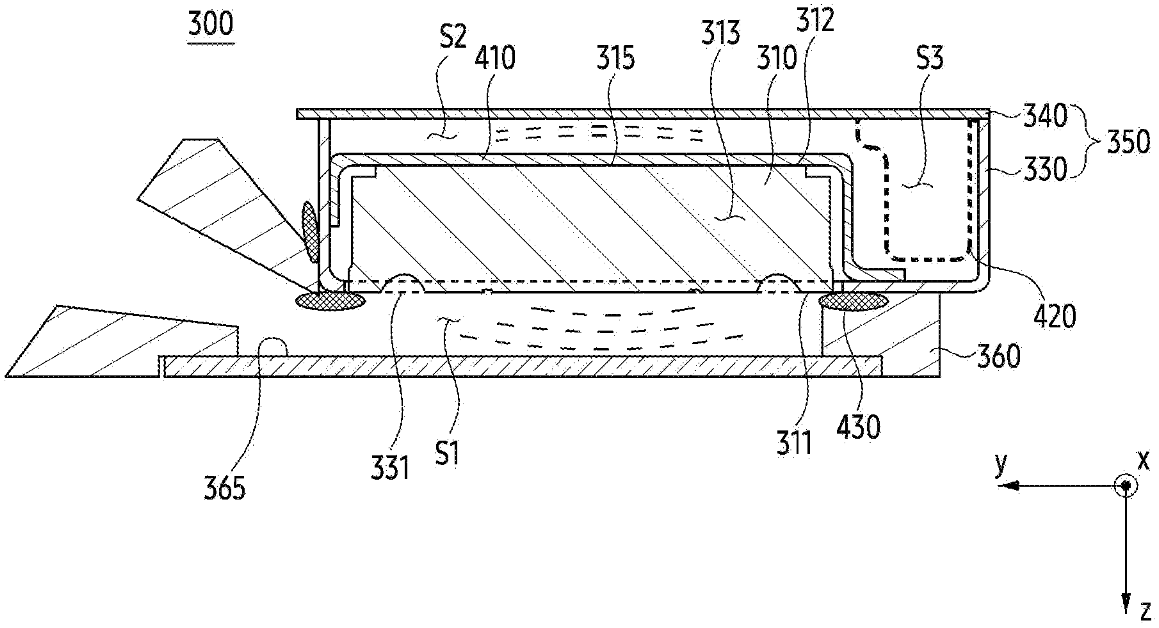
FIG. 4B is a cross-sectional view of an example speaker module.
Figure 4C:
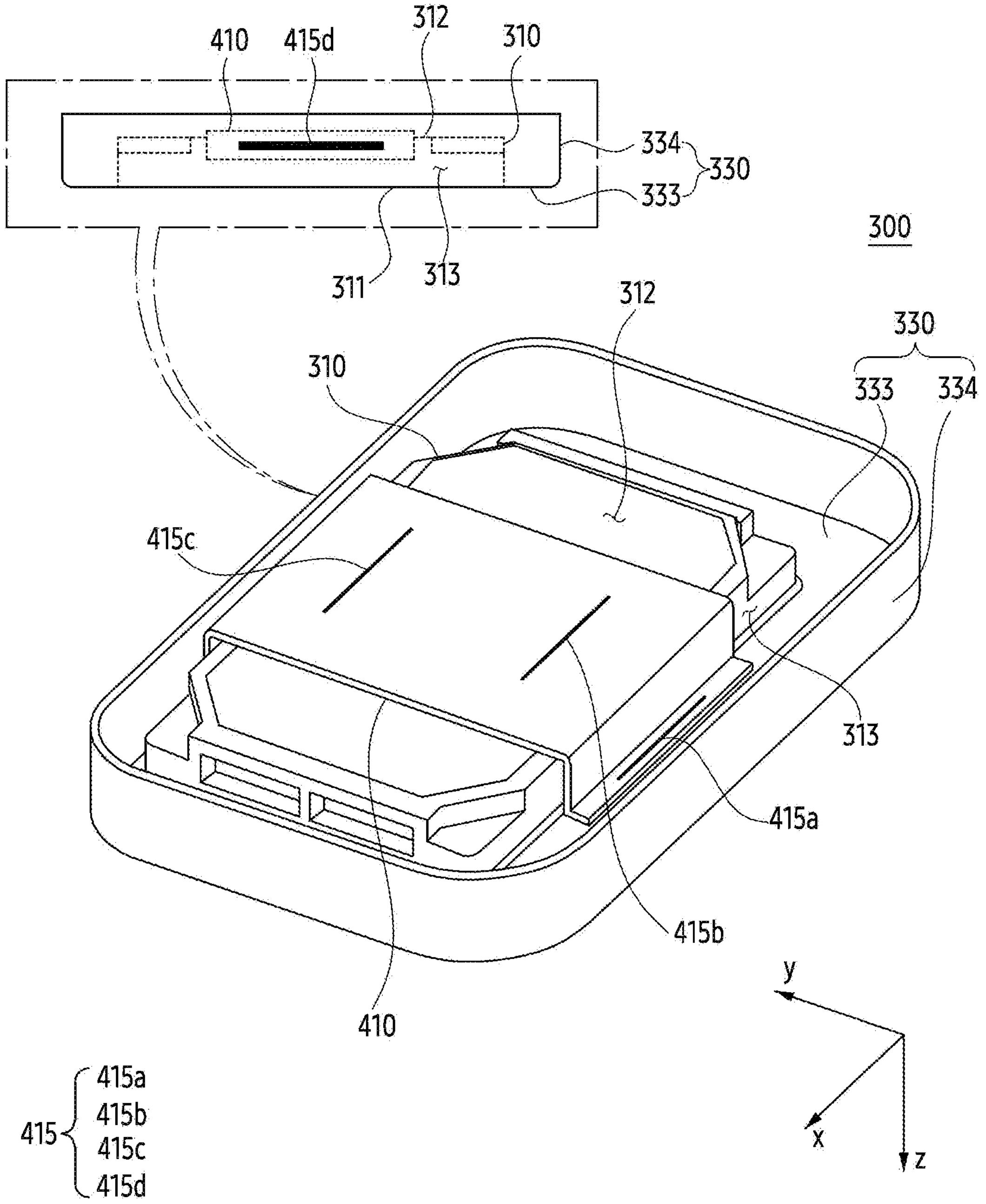
FIG. 4C illustrates a portion of an example speaker module.

FIG. 4A is an exploded perspective view of an example speaker module. FIG. 4B is a cross-sectional view of an example speaker module. And FIG. 4C illustrates a portion of an example speaker module.

Referring to FIGS. 4A and 4B, the speaker module 300 may include a speaker 310, a first housing 350, a second housing 360, a first space S1, and a second space S2. The first housing 350 may include a first portion 330 and a second portion 340. The first portion 330 may include a first opening 331. The second housing 360 may include a duct 365. The duct 365 may include an audio inlet at one end of the duct 365 which is closest to the diaphragm 314 and an audio outlet at another end of the duct 365 which is closest to the outside of the electronic device (e.g. the electronic device 101 of FIG. 1). According to an embodiment, the speaker 310 may include a first surface 311 including a diaphragm 314, a second surface 312 including a yoke 315, the second surface 312 being opposite to the first surface 311, and a third surface 313 extending from the first surface 311 to the second surface 312.

According to an embodiment, the second space S2 may be surrounded by the second surface 312 of the speaker 310, the third surface 313 of the speaker 310, and the first housing 350. For example, a periphery of the first surface 311 of the speaker 310 may be surrounded by a periphery of the first opening 331. The first surface 311 may be disposed in the first opening 331. The first surface 311 may cover the first opening 331. The second surface 312 and the third surface 313 of the speaker 310 may be disposed in the first housing 350. The second space S2 may be separated from the first space S1 by the first surface 311 of the speaker 310.

According to an embodiment, the speaker module 300 may further include a fastening member 410 in the first housing 350. The fastening member 410 may be in contact with the yoke 315 of the speaker 310 and in contact with a portion of the first housing 350, so as to fix the speaker 310 to the first housing 350.

For example, the fastening member 410 may be attached to the yoke 315 of the speaker 310. The fastening member 410 may face the speaker 310 with the yoke 315 therebetween. One end of the fastening member 410 may be attached to a portion of the first housing 350. The other end of the fastening member 410 may be attached to another portion of the first housing 350, crossing the second surface 312 of the speaker 310 including the yoke 315. For example, the fastening member 410 may be welded to the yoke 315 and to a portion of the first housing 350. The fastening member 410 may come into contact with the yoke 315 to block a movement of the speaker 310 in +z direction or −z direction according to the vibration of the diaphragm 314 of the speaker 310. The fastening member 410 in contact with the speaker 310 and the first housing 350 enables to fix the speaker 310 to the first housing 350.

According to an embodiment, the speaker module 300 may further include a separating member 420 disposed in the second space S2 and attached to a portion of the first housing 350. The speaker module 300 may further include a third space S3 disconnected from the second space S2 by the separating member 420. That is, the separating member 420 may have an inner volume which defines the third space S3. The third space S3 may include an air adsorption material (e.g., the air adsorption material 370 of FIG. 3). The separating member 420 may be configured to make air pass in or along the first housing 350. The speaker module 300 may dispose the third space S3 including the air adsorption material 370 in the first housing 350, to provide a back volume by the air adsorption material 370 to the second space S2.

According to an embodiment, the first surface 311 of the speaker 310 may be disposed along a periphery of the first opening 331. The second housing 360 may further include an adhesive member 430 in contact with the first portion 330 of the first housing 350 and the first surface 311 of the speaker 310. The adhesive member 430 can fix the first housing 350 to the second housing 360, such as to assist in sealing of the second space S2. For example, the adhesive member 430 may attach the periphery of the first surface 311 to the periphery of the first opening 331. The adhesive member 430 can seal the second space S2 such that the second space S2 is disconnected(or isolated) from the first space S1. The adhesive member 430 may come into contact with the first surface 311 of the speaker 310, the first housing 350 including the first opening 331, and the second housing 360, thereby attaching the first housing 350 to the second housing 360 and sealing the second space S2.

Referring to FIG. 4C, the speaker 310 may be fastened to the first portion 330 through the fastening member 410. The first portion 330 may further include a base 333 including a first opening (e.g., the first opening 331 of FIG. 3) and a sidewall 334 disposed along a periphery of the base 333.

According to an embodiment, the speaker module 300 may include a solder 415 in contact with both of the speaker 310 and the fastening member 410 for fixing the speaker 310 to the first portion 330 through the fastening member 410. The solder 415 may fix the speaker 310 to the fastening member 410.

For example, the solder 415 may include a first area 415*a* disposed between the fastening member 410 and the base 333 of the first portion 330. The solder 415 may include a second area 415*b* and a third area 415*c* disposed between the fastening member 410 and the second surface 312 of the speaker 310. The solder 415 may include a fourth area 415*d* disposed between the fastening member 410 and the sidewall 334 of the first portion 330. The fastening member 410 may extend from a portion of the fastening member 410 in contact with the first area 415*a* to the remaining portion of the fastening member 410 in contact with the fourth area 415*d*, crossing the second surface 312 of the speaker 310. The first area 415*a* and the fourth area 415*d* may fix the fastening member 410 to the first portion 330. The second area 415*b* and the third area 415*c* may fix the speaker 310 to the fastening member 410. The speaker module 300 may include a solder 415 including areas 415*a*, 415*b*, 415*c*, and 415*d*, thereby interrupting the speaker 310 from moving in the first direction (e.g., −z direction) or the second direction (e.g., +z direction) opposite to the first direction, upon operation of the speaker 310.

The speaker module 300 according to the above-described embodiment may include the fastening member 410, thereby enabling blocking or restricting the movement of the speaker 310 caused by the audio signal output from the speaker 310 and fixing the speaker 310 to the first housing 350. The speaker module 300 may include the air adsorption material 370 and the third space S3 disconnected from the second space S2, thereby providing a back volume to the second space S2. The speaker module 300 may include the adhesive member 430, thereby sealing the second space S2 and fixing the first housing 350 to the second housing 360.

Figure 5A:
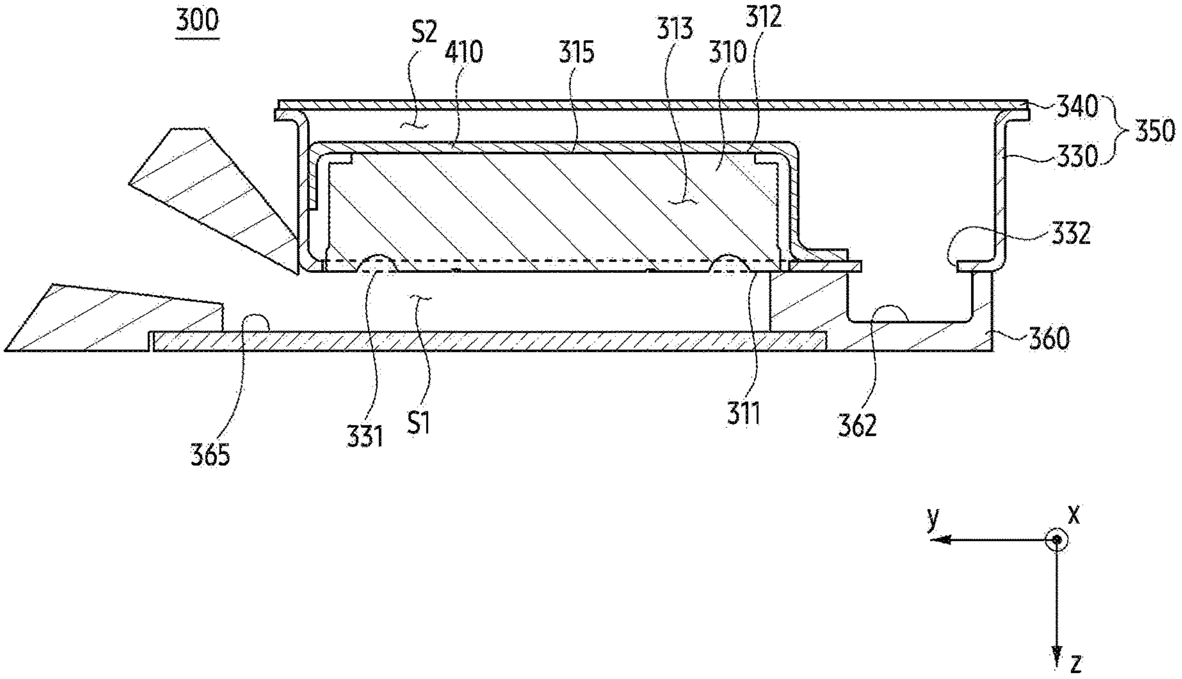
FIGS. 5A, 5B, 5C, and 5D are cross-sectional views of an example speaker module.
Figure 5B:
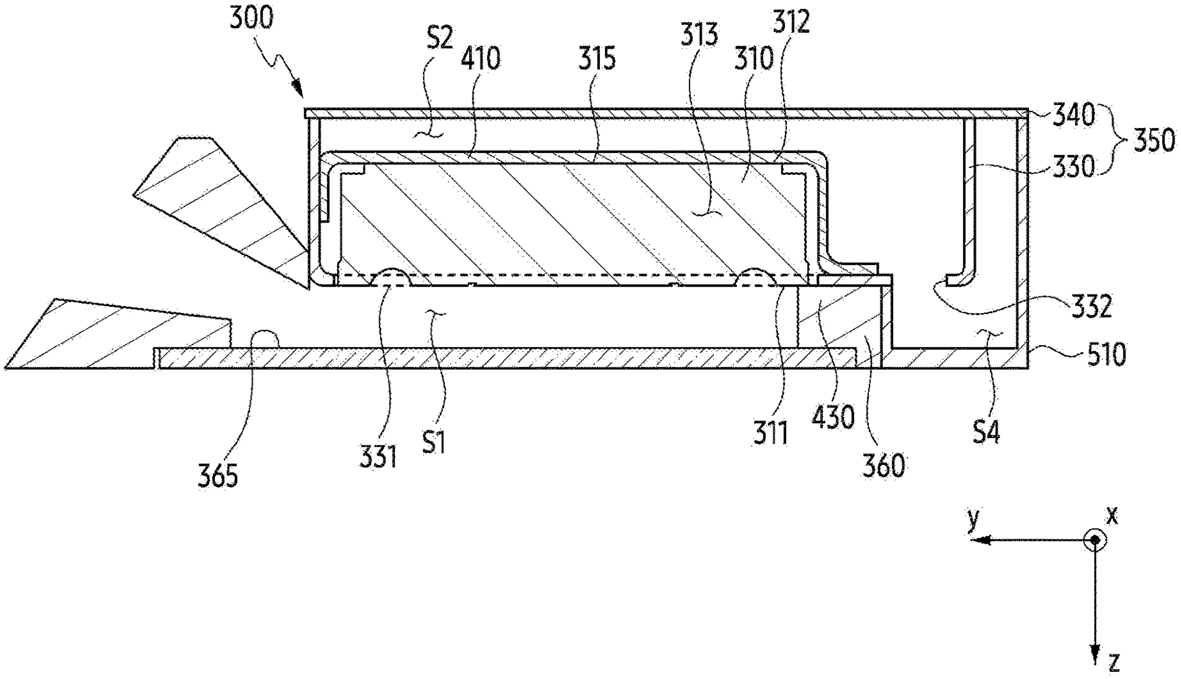

FIGS. 5A and 5B are cross-sectional views of an example speaker module.

Referring to FIGS. 5A and 5B, the speaker module 300 may include a speaker 310, a first housing 350, a second housing 360, a first space S1, and a second space S2. The first housing 350 may include a first portion 330 and a second portion 340. According to an embodiment, the speaker 310 may include a first surface 311 including a diaphragm 314, a second surface 312 including a yoke 315 and opposite to the first surface 311, and a third surface 313 extending from the first surface 311 to the second surface 312.

Referring to FIG. 5A, the first portion 330 of the first housing 350 may further include a through hole 332 spaced apart from the first opening 331. The second housing 360 may further include a groove 362 extending from the through hole 332. For example, the groove 362 of the second housing 360 may be connected to the second space S2 through the through hole 332 of the first housing 350. The second housing 360 may include the groove 362 connected to the second space S2 to provide an additional space in the second space S2 for resonance of the audio signal output from the speaker 310. The second housing 360 may define an extended volume at the groove 362 which is outside of the first housing 350 and in communication with a volume of the second space S2 which is within the first housing 350. The volume of the second space S2 and the extended volume defined by the second housing 360 may be sealed in similar manners to those described above.

Referring to FIG. 5B, the electronic device (e.g., the electronic device 101 of FIG. 1) may further include a support structure 510 supporting the speaker module 300. The electronic device 101 may further include a first housing 350 and a fourth space S4 surrounded by the support structure 510. The first housing 350 may further include a through hole 332 spaced apart from the first opening 331 and extending from the second space S2 to the fourth space S4. For example, the support structure 510 may be a part of a component in an electronic device (e.g., the electronic device 101 of FIG. 1) or a part of a structure (e.g., a bracket) for supporting the component. The support structure 510 may define an extended volume in communication with the through hole 332. The extended volume is outside of the first housing 350 and the second housing 360, and in communication with the volume of the second space S2 which is within the first housing 350. The volume of the second space S2 and the extended volume defined by the support structure 510 may be sealed in similar manners to those described above.

The speaker module 300 may come into contact with the support structure 510 to form the fourth space S4. The fourth space S4 may be connected to the second space S2 through the through hole 332 of the first housing 350. The electronic device 101, including the fourth space S4 connected to the second space S2, may provide an additional space in the second space S2 for resonance of the audio signal output from the speaker 310.

According to the above-described embodiment, the speaker module 300 may include a through hole 332 penetrating the first housing 350, thereby connecting the second space S2 to another sealed space (e.g., the fourth space S4). The speaker module 300 may include a structure (e.g., the groove 362) connected to the second space S2 through the through hole 332, thereby providing an additional space in the second space S2. The speaker module 300 may expand the second space S2, through the first housing 350 providing the second space S2, which is independent of the second housing 360 providing the first space S1.

Figure 5C:
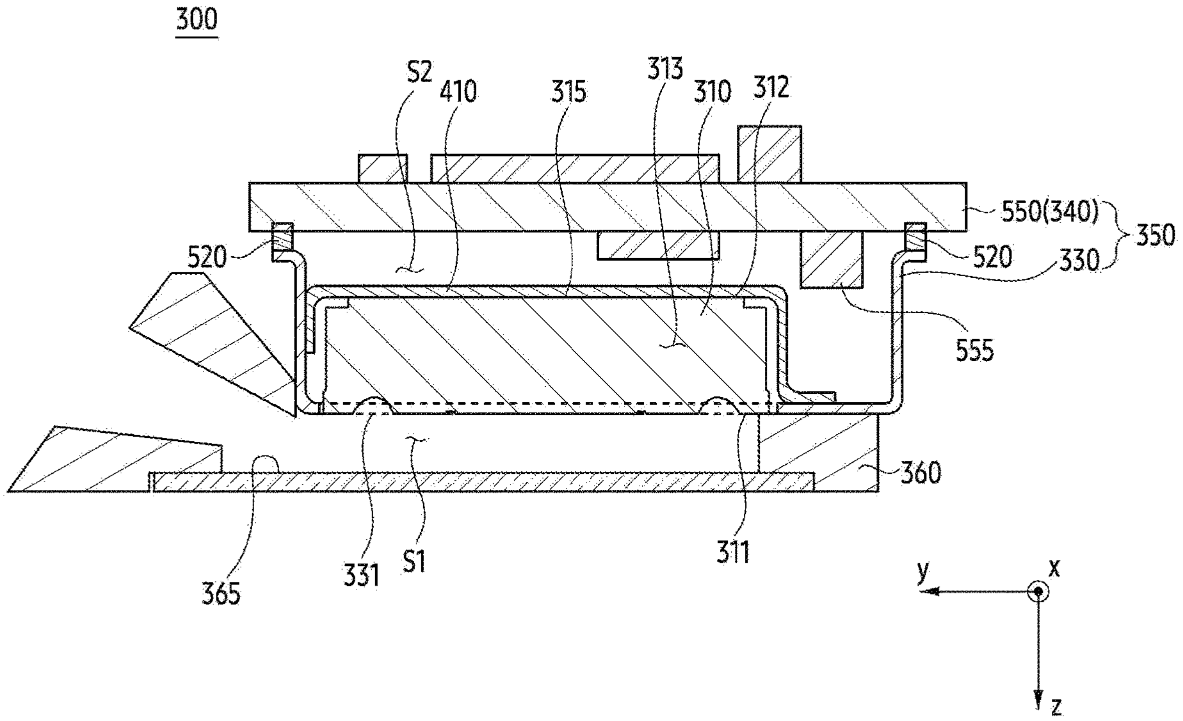
Figure 5D:
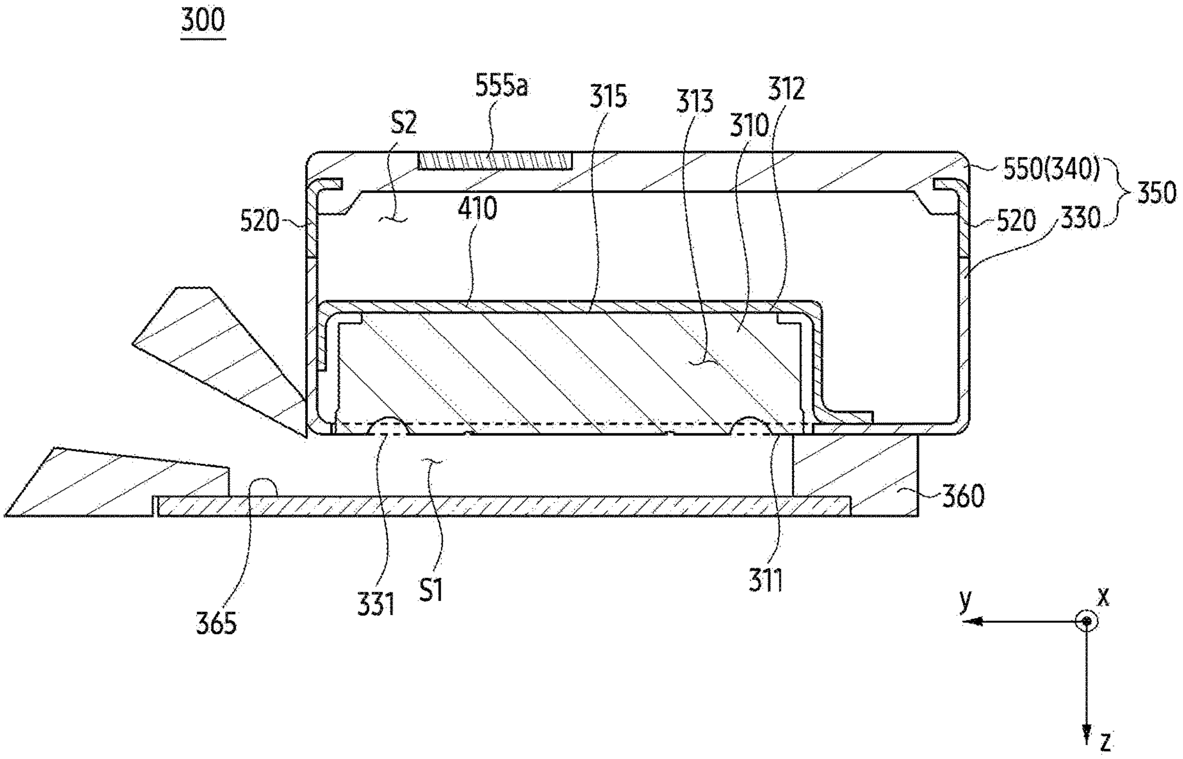

FIGS. 5C and 5D are cross-sectional views of an example speaker module.

Referring to FIGS. 5C and 5D, the speaker module 300 may include a speaker 310, a first housing 350, a second housing 360, a first space S1, and a second space S2. The first housing 350 may include a first portion 330 and a second portion 340. According to an embodiment, the speaker 310 may include a first surface 311 including a diaphragm 314, a second surface 312 including a yoke 315 and opposite to the first surface 311, and a third surface 313 extending from the first surface 311 to the second surface 312.

Referring to FIGS. 5C and 5D, the speaker module 300 may further include a sealing member (e.g., sealant 520) disposed between the first portion 330 and the second portion 340 of the first housing 350. The sealant 520 may seal the second space S2 at an intersection or meeting location of the first portion 330 and the second portion 340 of the first housing 350. For example, the sealant 520 may extend from the first portion 330 to the second portion 340. For example, the first housing 350 may include a fastening structure coupled to the sealant 520. For example, the sealant 520 may include a material having elasticity (e.g., rubber or sponge) to seal the second space S2. For example, the sealant 520 may be a solder for fixing the second portion 340 to the first portion 330. The speaker module 300 may include the sealant 520 to seal the second space S2 for resonance of the audio signal output from the speaker 310.

According to an embodiment, the electronic device (e.g., the electronic device 101 of FIG. 1) may further include a printed circuit board 550 in a housing (e.g., the housing 210 of FIG. 2) including an integrated circuit 555. The second portion 340 of the first housing 350 may be at least a portion of the printed circuit board 550. For example, the printed circuit board 550 may be a printed circuit board distinguished from the printed circuit board to which the speaker module 300 is connected. The printed circuit board 550 may be disposed on the speaker module 300 to seal the second space S2. A portion of the printed circuit board 550 in contact with the second space S2 may be the second portion 340 of the first housing 350. The integrated circuit 555 disposed in the portion of the printed circuit board 550 may be disposed in the second space S2.

According to an embodiment, the printed circuit board 550 may be of a deformable flexible printed circuit board. The integrated circuit 555 of the printed circuit board 550 may be configured to be used for communication with an external electronic device (e.g., the electronic device 104 of FIG. 1). For example, the integrated circuit 555 may include an antenna pattern **555*a***.

According to the above-described embodiment, the speaker module 300 may include a sealant 520 disposed between the first portion 330 and the second portion 340 to seal the second space S2 for resonance of the audio signal output from the speaker 310. The second portion 340 of the first housing 350 providing the second space S2 may be a portion of the printed circuit board 550 to simplify the structure of the speaker module 300.

Figure 6A:
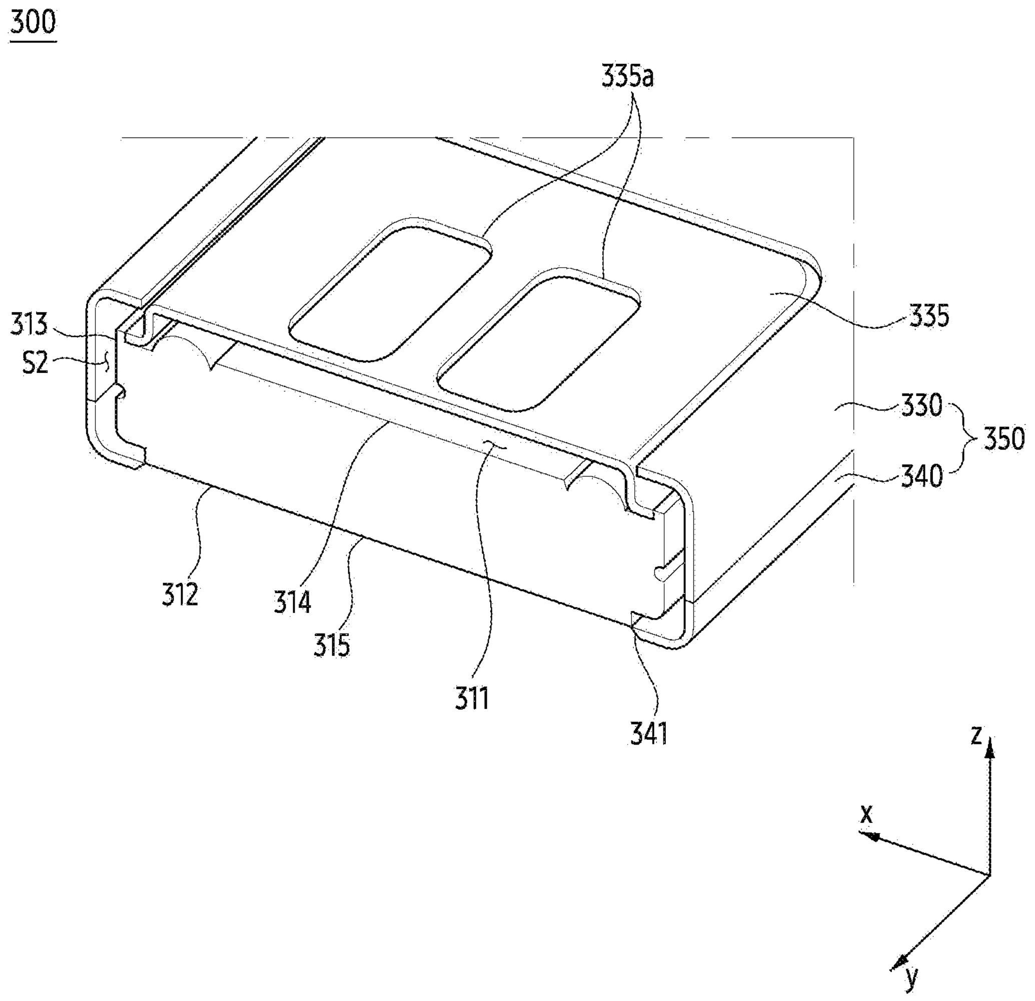
FIGS. 6A and 6B are illustrating a portion of an example speaker module.
Figure 6B:
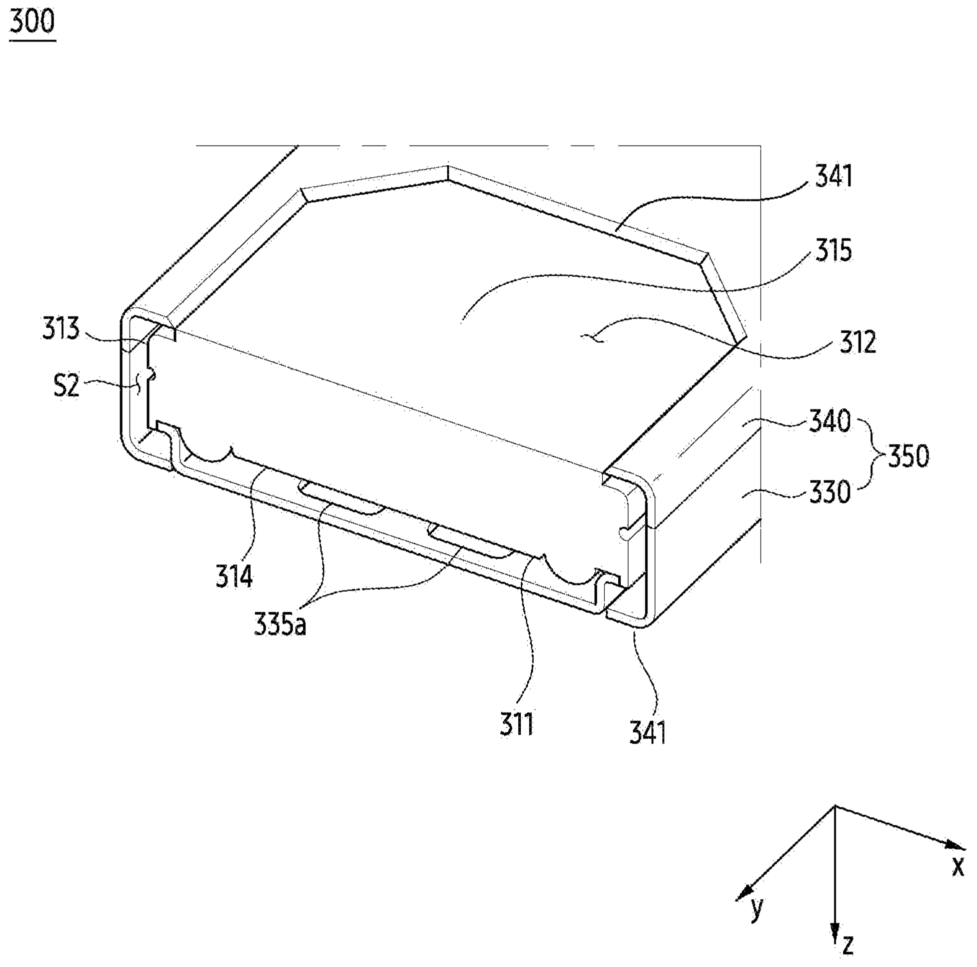

FIGS. 6A and 6B are illustrating a portion of example speaker modules.

Referring to FIGS. 6A and 6B, the speaker module 300 may include a speaker 310, a first housing 350, and a second space S2. The first housing 350 may include a first portion 330 and a second portion 340. According to an embodiment, the speaker 310 may include a first surface 311 including a diaphragm 314, a second surface 312 including a yoke 315 and opposite to the first surface 311, and a third surface 313 extending from the first surface 311 to the second surface 312.

According to an embodiment, the first housing 350 may further include a shielding structure 335 protruding from a periphery of the first surface 311 (or the diaphragm 314) of the speaker 310 toward the first opening 331 of the first portion 330. The shielding structure 335 may include a third opening **335*a* overlapping the first surface 311** when viewed from above.

For example, the shielding structure 335 may come into contact with the periphery of the first opening 331 to seal the second space S2. The speaker module 300 may be configured to transmit an audio signal emitted from the first surface 311 of the speaker 310 toward the first opening 331 to a duct 365 of the second housing (e.g., the second housing 360 of FIG. 3) through the third opening **335*a* of the shielding structure 335. The speaker module 300 may include the shielding structure 335 to protect the first surface 311 of the speaker 310** from an external impact.

According to an embodiment, the second space S2 may be surrounded by the third surface 313 of the speaker 310, the first housing 350, and a portion of the second surface 312 of the speaker 310. The second portion 340 of the first housing 350 may include a second opening 341 that causes the remaining portion of the second surface 312 to expose to the outside of the speaker module 300. A periphery of the second opening 341 may be in contact with the second surface 312 of the speaker 310.

For example, the speaker 310 may be configured to emit an audio signal through the first surface 311 of the speaker 310 and the third surface 313 of the speaker 310, by means of vibration of the diaphragm 314. A portion of the second surface 312 opposite to the first surface 311 may be exposed through the second opening 341 of the second portion 340, thereby causing the yoke 315 disposed on the second surface 312 to be exposed. The periphery of the second opening 341 may be come into contact with the second surface 312 to seal the second space S2 for the audio signal output through the third surface 313. The remaining portion except for the portion of the second surface 312 exposed through the second opening 341 may be in contact with or exposed to the second space S2.

According to the above-described embodiment, the speaker module 300 may be configured to seal the second space S2 for the audio signal emitted from the third surface 313 of the speaker 310, thereby improving the sound quality of the audio signal. The speaker module 300 may include the second opening 341 exposing at least a portion of the second surface 312, thereby further simplifying the structure of the speaker module 300. The speaker module 300 may include the shielding structure 335 protruding from the periphery of the first surface 311 toward the first opening 331 in the first portion 330, so as to protect the speaker 310 from an external impact.

Figure 7A:
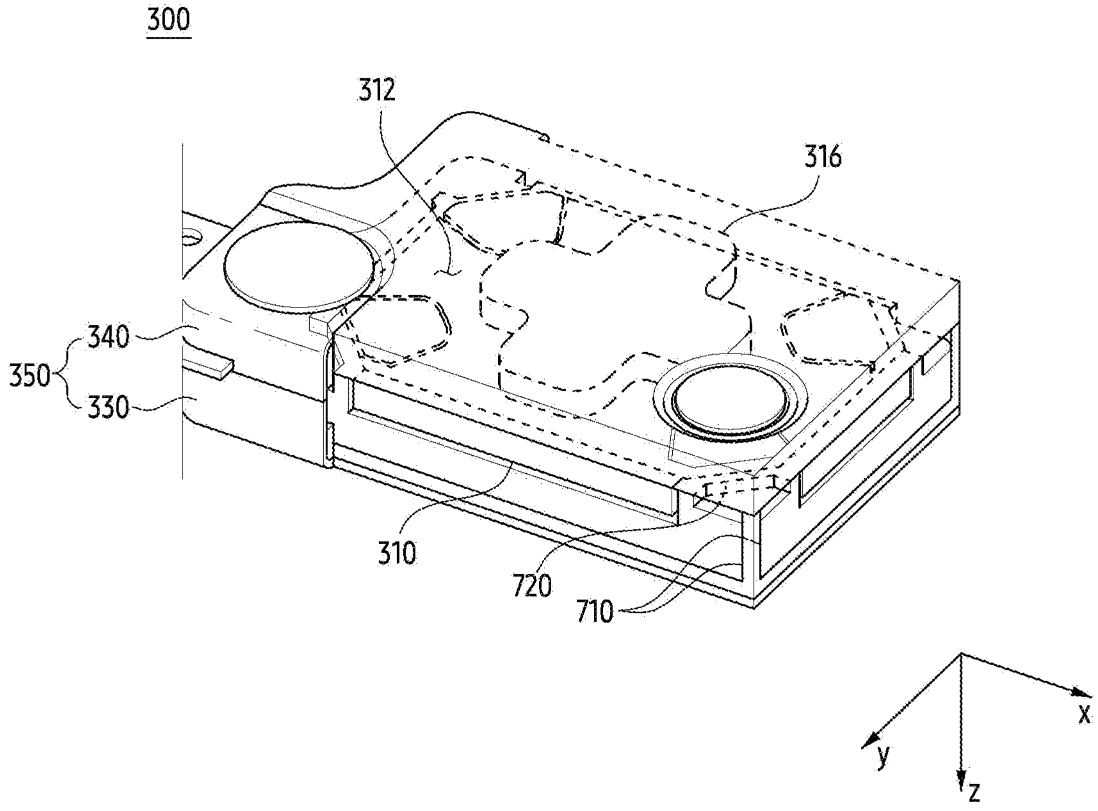
FIG. 7A is a perspective view of an example speaker module.
Figure 7B:
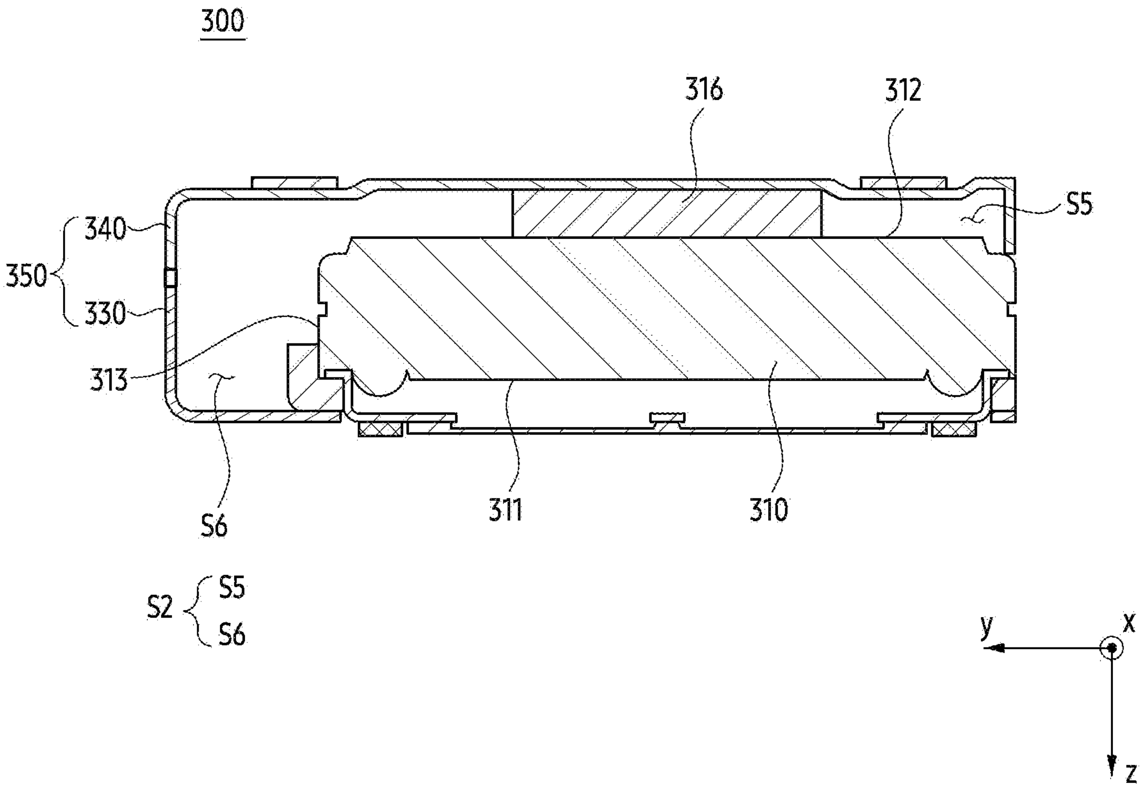
FIG. 7B is a cross-sectional view of the example speaker module of FIG. 7A.

FIG. 7A is a perspective view of an example speaker module. FIG. 7B is a cross-sectional view of an example speaker module of FIG. 7A.

Referring to FIGS. 7A and 7B, the speaker module 300 may include a speaker 310, a first housing 350, and a second space S2. The first housing 350 may include a first portion 330 and a second portion 340.

According to an embodiment, the second space S2 may be formed to be surrounded by the second surface 312 of the speaker 310, the first housing 350, and a portion of the third surface 313 of the speaker 310. The first housing 350 may further include a fourth opening 710 exposing a remaining portion of the third surface 313 to the outside of the speaker module 300.

The second surface 312 of the speaker 310 may further include a step 720 configured to connect the second space S2 to the outside of the speaker module 300 through the fourth opening 710. For example, a portion of the third surface 313 of the speaker 310 may be surrounded by the first housing 350. The remaining portion of the third surface 313 may be in contact with a periphery of the fourth opening 710. As the remaining portion of the third surface 313 comes into contact with the periphery of the fourth opening 710, the third surface 313 may seal the second space S2. The second surface 312 of the speaker 310 may include the step 720 connected to the fourth opening 710, thereby providing a passage for ventilation in the second space S2.

According to an embodiment, the second space S2 may include a fifth space S5 connected to the outside of the speaker module 300 through the step 720. The second space S2 may further include a sixth space S6 spaced apart from the fifth space S5 and in contact with a portion of the third surface 313 of the speaker 310. The speaker 310 may further include a protruding structure 316 between the fifth space S5 and the sixth space S6. The protruding structure 316 may be disposed on the second surface 312 of the speaker 310. The protruding structure 316 may seal the sixth space S6 to isolate the sixth space S6 from the fifth space S5. For example, the protruding structure 316 may be configured to be in contact with the second surface 312 of the speaker 310 and the first housing 350, so that the fifth space S5 for ventilation of the speaker module 300 is disconnected from the sixth space S6 for resonance of an audio signal emitted from the second surface 312. The speaker module 300 including the protruding structure 316 may cause the air in the speaker module 300 to be ventilated through the fifth space S5 and improve the sound quality of the audio signal through the sixth space S6.

According to the above-described embodiment, the speaker module 300 may include a fourth opening 710 exposing at least a portion of the third surface 313 of the speaker 310 and the step 720 configured to connect the second space S2 to the outside of the speaker module 300 through the fourth opening 710, thereby ventilating air in the speaker module 300. The speaker module 300, including the protruding structure 316, may disconnect(or isolate) the fifth space S5 for ventilation of the speaker module 300 from the sixth space S6 for resonance of the audio signal emitted from the second surface 312, and may seal the sixth space S6.

According to the above-described embodiments, an electronic device (e.g., an electronic device 101 of FIG. 1) may include a housing (e.g., a housing 210 of FIG. 2) including a speaker hole (e.g., a speaker hole 207 of FIG. 2) and a speaker module (e.g., a speaker module 300 of FIG. 3) in the housing. The speaker module may include a speaker (e.g., a speaker 310 of FIG. 3) including a first surface (e.g., a first surface 311 of FIG. 3) configured to output an audio signal, a second surface (e.g., a second surface 312 of FIG. 3) opposite to the first surface and including a yoke (e.g., a yoke 315 of FIG. 3), and a third surface (e.g., a third surface 313 of FIG. 3) extending from the first surface to the second surface. The speaker module may include a first housing (e.g., a first housing 350 of FIG. 3) surrounding at least a portion of the third surface, the first housing including a first portion(330) including a first opening (e.g., a first opening 331 of FIG. 3) overlapping the first surface when viewed from above and metal, and a second portion (e.g., a second portion 340 of FIG. 3) disposed on the first portion. The speaker module may include a second housing (e.g., a second housing 360 of FIG. 3) attached to the first housing and including a duct (e.g., a duct 365 of FIG. 3) extending from the first opening to the speaker hole. The speaker module may include a first space (e.g., a first space S1 of FIG. 3) being in contact with the first surface and extending from the first opening through the duct to the speaker hole, and a second space (e.g., a second space S2 of FIG. 3) in the first housing, being disconnected from the first space by the speaker. The second portion of the first housing may seal the second space.

That is, the speaker module may include the speaker which outputs the audio signal in a first direction and in a second direction which is opposite to the first direction, and a speaker housing defining an audio output duct which is disposed in the second direction from the speaker. The audio output duct define a first space which extends from the speaker and in a lateral direction crossing the first direction and the second direction. The first space is in communication with the speaker and with the speaker hole and through which the audio signal is output from the speaker housing. The second space to which the speaker is exposed in the first direction is an enclosed space disconnected from the first space of the audio output duct, by the speaker.

According to the above-described embodiment, the electronic device may include a speaker module including a first housing and a second housing, thereby improving the sound quality of an audio signal output from the speaker and protecting the speaker from an external impact. The first housing may include a first opening connected to a duct of the second housing, thereby simplifying the structure of the speaker module. The first housing may provide a second space for resonance of the audio signal output from the speaker, thereby improving the sound quality of the audio signal. The second housing may include the duct to provide a passage through which the audio signal is transmitted to the outside. The first housing may include metal to increase the second space. The second portion of the first housing can improve the sound quality of the audio signal output from the speaker by sealing the second space. The above-mentioned embodiments may have various effects in addition to the above-mentioned effects.

According to an embodiment, the speaker module may further include a fastening member (e.g., the fastening member 410 of FIG. 4A) in the first housing, the fastening member being configured to be in contact with the yoke and be further in contact with a portion of the first housing so as to fix the speaker to the first housing. According to the above-mentioned embodiment, the speaker module may include the fastening member to block movement of the speaker and fix the speaker to the first housing. The above-mentioned embodiment may have various effects in addition to the above-mentioned effects.

According to an embodiment, the second space may be surrounded by the second surface, the third surface, and the first housing. According to the above-described embodiment, the second space may be surrounded by the second surface, the third surface, and the first housing to provide a space for resonance of an audio signal emitted from the second surface and/or the third surface. The above-mentioned embodiment may have various effects in addition to the above-mentioned effects.

According to an embodiment, the speaker module may further include a separating member (e.g., a separating member 420 of FIG. 4B) disposed in the second space S2 and attached to a portion of the first housing. The speaker module may further include a third space (e.g., a third space S3 of FIG. 4B) disconnected from the second space by the separating member and including an air adsorbent material 370 (e.g., an air adsorbent 370 of FIG. 3). According to the above-described embodiment, the speaker module may include the separating member and the third space including the air adsorbent material to provide the second space with a back volume formed by adsorption of air in the second space. The above-mentioned embodiment may have various effects in addition to the above-mentioned effects.

The electronic device according to an embodiment may further include a support structure (e.g., a support structure 510 of FIG. 5B) configured to support the speaker module. The electronic device may further include a fourth space (e.g., a fourth space S4 of FIG. 5B) surrounded by the first housing and the support structure. The first housing may further include a through hole (e.g., a through hole 332 of FIG. 5B) spaced apart from the first opening and extending from the second space to the fourth space. According to the above-described embodiment, the electronic device may include the support structure and the fourth space, thereby supporting the speaker module and expanding the second space for resonance of an audio signal. The above-mentioned embodiment may have various effects in addition to the above-mentioned effects.

According to an embodiment, the first portion of the first housing may further include a through hole (e.g., a through hole 332 of FIG. 5A) spaced apart from the first opening 331. The second housing may further include a groove (e.g., a groove 362 of FIG. 5A) extending from the through hole. According to the above-described embodiment, the speaker module may include the through hole and the groove to expand the second space for resonance of an audio signal. The above-mentioned embodiment may have various effects in addition to the above-mentioned effects.

According to an embodiment, the speaker module may further include a sealing member (e.g., a sealant 520 of FIG. 5C) configured to seal the second space and disposed between the first portion and the second portion. According to the above-mentioned embodiment, the speaker module may include the sealant to seal the second space. The above-mentioned embodiment may have various effects in addition to the above-mentioned effects.

According to an embodiment, the first surface of the speaker may be disposed along a periphery of the first opening. The second housing may further include an adhesive member (e.g., an adhesive member 430 of FIG. 4B) in contact with the first portion and the first surface and configured to fix the first housing 350 to the second housing. According to the above-mentioned embodiment, the first surface may be disposed along the periphery of the first opening to seal the second space. The speaker module may include the adhesive member to separate the first space from the second space and attach the first housing to the second housing. The above-mentioned embodiment may have various effects in addition to the above-mentioned effects.

The electronic device according to an embodiment may further include a printed circuit board (e.g., a printed circuit board 550 of FIG. 5C) in the housing including an integrated circuit (e.g., an integrated circuit 555 of FIG. 5C). The second portion of the first housing may be at least a portion of the printed circuit board. According to the above-described embodiment, the speaker module may be configured such that the second portion is formed as a portion of the printed circuit board, thereby simplifying the structure of the speaker module and expanding the second space. The above-mentioned embodiment may have various effects in addition to the above-mentioned effects.

According to an embodiment, the printed circuit board may be a deformable flexible printed circuit board. The integrated circuit may be configured to be used for communication with an external electronic device (e.g., an electronic device 104 of FIG. 1). According to the above-described embodiment, the speaker module may be configured as a part of the flexible printed circuit board to simplify the structure of the speaker module and expand the second space. The above-mentioned embodiment may have various effects in addition to the above-mentioned effects.

According to an embodiment, the second space may be surrounded by the third surface 313, the first housing, and a portion of the second surface. The second portion of the first housing may include a second opening (e.g., a second opening 341 of FIG. 6B) that exposes the remaining portion of the second surface to the outside of the speaker module. A periphery of the second opening may be in contact with the second surface of the speaker. According to the above-described embodiment, the speaker module may include the second opening to simplify the structure of the speaker module and seal the second space for an audio signal emitted from the third surface. The above-mentioned embodiment may have various effects in addition to the above-mentioned effects.

According to an embodiment, the first housing may further include a shielding structure (e.g., a shielding structure 335 of FIG. 6A) that is in contact with the second space and protrudes from a periphery of the first surface toward the first opening of the first portion. The shielding structure may include a third opening (e.g., a third opening 335*a* of FIG. 6A) overlapping the first surface when viewed from above. According to the above-described embodiment, the speaker module may include the shielding structure to reduce damage to the speaker due to an external impact. The shielding structure may include the third opening to provide a passage through which an audio signal emitted from the first surface toward the first opening is transmitted to the duct. The above-mentioned embodiment may have various effects in addition to the above-mentioned effects.

According to an embodiment, the second portion of the first housing may be at least a portion of the housing. According to the above-mentioned embodiment, the second portion may be configured as at least a portion of the housing, thereby simplifying the structure of the speaker module. The above-mentioned embodiment may have various effects in addition to the above-mentioned effects.

According to an embodiment, the second space may be surrounded by the second surface, the first housing, and a portion of the third surface. The first housing may further include a fourth opening (e.g., a fourth opening 710 of FIG. 7A) configured to expose the remaining portion of the third surface to the outside of the speaker module. The second surface of the speaker may further include a step (e.g., a step 720 of FIG. 7A) connecting the second space and the outside of the speaker module through the fourth opening. According to the above-described embodiment, the speaker module may include the fourth opening and the step to provide a structure for facilitating ventilation in the second space. The above-mentioned embodiment may have various effects in addition to the above-mentioned effects.

According to an embodiment, the second space may include a fifth space (e.g., a fifth space S5 of FIG. 7A) connected to the outside of the speaker module through the step and a sixth space (e.g., a sixth space S6 of FIG. 7A) spaced apart from the fifth space S5 and in contact with the portion of the third surface. The speaker may further include a protruding structure (e.g., a protruding structure 316 of FIG. 7A) disposed in between the fifth space and the sixth space, protruding structure being configured to be disposed on the second surface and seal the sixth space. According to the above-described embodiment, the speaker module may include the protruding structure to ventilate air in the speaker module through the fifth space and improve sound quality of an audio signal through the sixth space. The above-mentioned embodiment may have various effects in addition to the above-mentioned effects.

An electronic device according to an embodiment may include a housing including a speaker hole and a speaker module in the housing. The speaker module may include a speaker including a first surface including a diaphragm (e.g., a diaphragm 314 of FIG. 3), a second surface opposite to the first surface and including a yoke, and a third surface extending from the first surface to the second surface. The speaker module may include a first housing including a first portion including a first opening overlapping the first surface when viewed from above, and a second portion disposed on the first portion, the first housing surrounding at least a portion of the third surface. The speaker module may include a fastening member in the first housing, the fastening member being in contact with the yoke and being further in contact with a portion of the first portion to fix the speaker to the first housing. The speaker module may include a second housing attached to the first housing and including a duct extending from the first opening to the speaker hole. The speaker module may include a first space being in contact with the first surface and extending from the first opening to the speaker hole through the duct, and a second space in the first housing, being disconnected from the first space by the speaker. The second portion of the first housing may be configured to seal the second space.

According to the above-described embodiment, the electronic device may include the speaker module including the first housing and the second housing, thereby improving the sound quality of an audio signal output from the speaker and protecting the speaker from any external impact. The speaker module may include the fastening member to block movement of the speaker and fix the speaker to the first housing. The first housing may include the first opening connected to the duct of the second housing, thereby simplifying the structure of the speaker module. The first housing may provide the second space for resonance of the audio signal output from the speaker, thereby improving the sound quality of the audio signal. The second housing may include the duct to provide a passage through which the audio signal is transmitted to the outside. The second portion of the first housing may seal the second space to improve the sound quality of the audio signal output from the speaker.

According to an embodiment, the second space may be surrounded by the second surface, the third surface, and the first housing. According to the above-described embodiment, the second space may be surrounded by the second surface, the third surface, and the first housing to provide a space for resonance of an audio signal emitted from the second surface and/or the third surface. The above-mentioned embodiment may have various effects in addition to the above-mentioned effects.

According to an embodiment, the speaker module may further include a separating member disposed in the second space and attached to a portion of the first housing. The speaker module may include a third space disconnected from the second space by the separating member and including an air adsorbent material. According to the above-described embodiment, the speaker module may include the third space including the separating member and the air adsorbent material to provide the second space with a back volume formed by adsorption of air in the second space. The above-mentioned embodiment may have various effects in addition to the above-mentioned effects.

The electronic device according to an embodiment may further include a support structure configured to support the speaker module, and a fourth space surrounded by the first housing and the support structure. The first housing may further include a through hole spaced apart from the first opening and extending from the second space to the fourth space. According to the above-described embodiment, the electronic device may include the support structure and the fourth space to support the speaker module and expand the second space for resonance of an audio signal. The above-mentioned embodiment may have various effects in addition to the above-mentioned effects.

According to an embodiment, the first surface of the speaker may be disposed along a periphery of the first opening. The second housing may further include an adhesive member in contact with the first portion and the first surface and fixing the first housing to the second housing. According to the above-mentioned embodiment, the first surface may be disposed along the periphery of the first opening to seal the second space. The speaker module may include the adhesive member to separate the first space from the second space and attach the first housing to the second housing. The above-mentioned embodiment may have various effects in addition to the above-mentioned effects.

According to an embodiment, the second space may be surrounded by the third surface, the first housing, and a portion of the second surface. The second portion of the first housing may include a second opening exposing the remaining portion of the second surface. A periphery of the second opening may be in contact with the second surface of the speaker. According to the above-described embodiment, the speaker module may include the second opening to simplify the structure of the speaker module and seal the second space for an audio signal emitted from the third surface. The above-mentioned embodiment may have various effects in addition to the above-mentioned effects.

According to an embodiment, the first housing may further include a shielding structure that is in contact with the second space and protrudes from a periphery of the first surface toward the first opening of the first portion. The shielding structure may include a third opening overlapping the first surface when viewed from above. According to the above-described embodiment, the speaker module may include the shielding structure to reduce damage to the speaker due to an external impact. The shielding structure may include the third opening to provide a passage through which an audio signal emitted from the first surface toward the first opening is transmitted to the duct. The above-mentioned embodiment may have various effects in addition to the above-mentioned effects.

The electronic device according to various embodiments disclosed herein may be one of various types of electronic devices. The electronic devices may include, for example, a portable communication device (e.g., a smartphone), a computer device, a portable multimedia device, a portable medical device, a camera, a wearable device, or a home appliance. According to an example, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. Within the Figures and the text of the disclosure, a reference number indicating a singular form of an element may also be used to reference a plurality of the singular element.

It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

As used herein, such terms as "1st" and "2nd," or "first" and "second" may be used to simply distinguish a corresponding component from another, and does not limit the components in other aspect (e.g., importance or order).

It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used in connection with various embodiments of the disclosure, the term "module" may include a unit implemented in hardware, software, or firmware, and may be interchangeably used with other terms, for example, "logic," "logic block," "part," or "circuitry". A module may be a single integral component, or a minimum unit or part thereof, adapted to perform one or more functions. For example, according to an example, the module may be implemented in a form of an application-specific integrated circuit (ASIC).

Various embodiments as set forth herein may be implemented as software (e.g., a program 140) including one or more instructions that are stored in a storage medium (e.g., an internal memory 136 or an external memory 138) that is readable by a machine (e.g., an electronic device 101). For example, a processor (e.g., a processor 120 of an electronic device 101) of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Where, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
a housing defining a speaker hole; and
a speaker module disposed in the housing, the speaker module including:
a speaker including:
a front side configured to output an audio signal, the audio signal transferred through the speaker hole of the housing to outside of the electronic device,
a rear side, and
a lateral side extending from the front side of the speaker to the rear side of the speaker; and
a speaker housing enclosing the speaker, the speaker housing including:
a front portion defining an opening overlapping the front side of the speaker, the opening functioning as a path of the audio signal;
a rear portion, and
a lateral portion extending from the front portion of the speaker housing to the rear portion of the speaker housing, the lateral portion and the rear portion configured with at least one metal material;
a resonance space configured to be surrounded by the rear side of the speaker, the lateral side of the speaker od the speaker housing;
an air-permeable member configured to divide the resonance space into a first partial space and a second partial space; and
an air adsorbent disposed in the second partial space.

2. The electronic device of claim 1,
wherein the speaker module further includes a fastening member disposed in the speaker housing,
wherein the rear side of the speaker includes a yoke, and
wherein the fastening member is in contact with the yoke of the rear side of the speaker and fastens the speaker to the speaker housing by contacting a portion of the speaker housing.

3. The electronic device of claim 1,
wherein the air-permeable member is attached to a portion of the speaker housing.

4. The electronic device of claim 1, further comprising:
a supporting structure supporting the speaker module,
wherein the speaker housing and the supporting structure define an extending space, and
wherein the extending space is extended from the resonance space of the speaker housing via a through hole, the through hole is spaced apart from the opening of the front portion of the speaker housing.

5. The electronic device of claim 1, further comprising:
a support housing attached to the speaker housing and including a duct extending from the opening of speaker housing to the speaker hole,
wherein the front portion of the speaker housing further includes a through hole spaced apart from the opening of the speaker housing, and
wherein the support housing further includes a groove extending from the through hole.

6. The electronic device of claim 1,
wherein the speaker module further includes a sealant sealing the resonance space and disposed between the front portion and the rear portion of the speaker housing.

7. The electronic device of claim 1, further comprising:
a support housing attached to the speaker housing and including a duct extending from the opening of speaker housing to the speaker hole,
wherein the front side of the speaker is disposed along a periphery of the opening of the speaker housing, and
wherein the support housing further includes an adhesive member for fastening the speaker housing to the support housing, the adhesive member in contact with the front portion of the speaker housing and the front side of the speaker.

8. The electronic device of claim 1, further comprising:
a printed circuit board disposed in the speaker housing and including an integrated circuit, and
wherein the rear portion of the speaker housing is at least a portion of the printed circuit board.

9. The electronic device of claim 8, wherein the printed circuit board is a deformable flexible printed circuit board, and wherein the integrated circuit is configured to be used for communication with an external electronic device.

10. The electronic device of claim 1, wherein the resonance space is surrounded by the lateral side of the speaker, the speaker housing, and a portion of the rear side of the speaker, wherein the rear portion of the speaker housing includes an added opening exposing a remaining portion of the rear side of the speaker to an outside of the speaker module, and wherein a periphery of the added opening is in contact with the rear side of the speaker.

11. The electronic device of claim 10, wherein the speaker housing further includes a shielding structure in contact with the resonance space and protruding from a periphery of the front side of the speaker toward the opening of the front portion of the speaker housing, and wherein the shielding structure includes a shield opening overlapping the front side of the speaker.

12. The electronic device of claim 1, wherein the rear portion of the speaker housing is at least a portion of the housing of the electronic device.

13. The electronic device of claim 1, wherein the resonance space is surrounded by the rear side of the speaker, the speaker housing, and a portion of the lateral side of the speaker, wherein the speaker housing further includes another opening exposing a remaining portion of the lateral side of the speaker to outside of the speaker module, and wherein the rear side of the speaker further includes a step connecting the resonance space and the outside of the speaker module through the another opening.

14. The electronic device of claim 13, wherein the resonance space includes a step space connected to the outside of the speaker module through the step, and a sealed space spaced apart from the step space and being in contact with the portion of the lateral side of the speaker, and wherein the speaker further includes a protruding structure between the step space and the sealed space, the protruding structure being disposed on the rear side of the speaker and configured to seal the sealed space.

15. The electronic device of claim 1, wherein the front portion and the rear portion of the speaker housing is configured with at least the one metal material.

16. An electronic device, comprising:
a housing defining a speaker hole;
a speaker module disposed in the housing, the speaker module including:
a speaker including:
a front side configured to output an audio signal, the audio signal transferred through the speaker hole to outside of the electronic device,
a rear side, and
a lateral side extending from the front side of the speaker to the rear side of the speaker;
a speaker housing enclosing the speaker, the speaker housing including:
a front portion defining an opening overlapping the front side of the speaker, the opening functioning as a path of the audio signal,
a rear portion, and
a lateral portion extending from the front portion of the speaker housing to the rear portion of the speaker housing;
a resonance space configured to be surrounded by the rear side of the speaker, the lateral side of the speaker and the speaker housing; and
an air-permeable member configured to divide the resonance space into a first partial space and a second partial space,
wherein the speaker module further includes an air adsorbent disposed in the resonance space.

17. The electronic device of claim 16, further comprising: a supporting structure supporting the speaker module, wherein the speaker housing and the supporting structure define an extending space, and wherein the extending space is extended from the resonance space of the speaker housing via a through hole, the through hole is spaced apart from the opening of the front portion of the speaker housing.

18. The electronic device of claim 16, further comprising: a support housing attached to the speaker housing and including a duct extending from the opening to the speaker hole, wherein the front side of the speaker is disposed along a periphery of the opening of the speaker housing, and wherein the support housing further includes an adhesive member for fastening the speaker housing to the support housing, the adhesive member in contact with the front portion of the speaker housing and the front side of the speaker.

* * * * *